(12) United States Patent
Okuno et al.

(10) Patent No.: US 6,546,157 B1
(45) Date of Patent: Apr. 8, 2003

(54) NUMBER-OF-PIXELS CONVERSION APPARATUS AND DISPLAY APPARATUS USING THE SAME

(75) Inventors: Yoshiaki Okuno, Tokyo (JP); Jun Someya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,670

(22) Filed: Sep. 8, 1999

(30) Foreign Application Priority Data

Oct. 29, 1998 (JP) ............................................. 10-308425

(51) Int. Cl.⁷ ............................. G06K 9/32; H04N 1/46
(52) U.S. Cl. ........................................ 382/300; 358/525
(58) Field of Search ................................ 382/300, 298, 382/299, 305; 345/441, 472, 475; 358/428, 525, 528; 725/37; 348/452

(56) References Cited

U.S. PATENT DOCUMENTS 5,229,868 A * 7/1993 Kanno et al. ............... 358/462
5,381,526 A * 1/1995 Ellson ......................... 345/530
5,544,294 A * 8/1996 Cho et al. .................... 345/441
5,796,437 A * 8/1998 Muraji et al. ................ 348/452
6,184,894 B1 * 2/2001 Rosman et al. ............. 345/430
6,311,328 B1 * 10/2001 Miyazaki et al. ............. 725/37
6,339,434 B1 * 1/2002 West et al. .................. 345/667

FOREIGN PATENT DOCUMENTS

JP    9326958 A    12/1997

* cited by examiner

*Primary Examiner*—Bhavesh Mehta
*Assistant Examiner*—Kanji Patel

(57) ABSTRACT

A number-of-pixels conversion apparatus for converting the number of pixels of an original image or a display apparatus using the same has an interpolation coefficient generator for generating an interpolation coefficient that is obtained by a function with the distance between an interpolation pixel and a reference pixel, said function has a first derivative that is smaller than −1 at least in a partial range, whereby the apparatus enables a pixel data interpolation process that produces a post-conversion image that is low in the degree of blurring even if the original image has a steep density variation.

30 Claims, 26 Drawing Sheets

○ PIXELS OF ORIGINAL IMAGE
◉ PIXEL OF IMAGE AFTER ENLARGING CONVERSION
△ RESULTS OF HORIZONTAL ENLARGING INTERPOLATION

○ PIXELS OF ORIGINAL IMAGE
◉ PIXEL OF IMAGE AFTER ENLARGING CONVERSION
△ RESULTS OF HORIZONTAL ENLARGING INTERPOLATION

NUMBER-OF-PIXELS CONVERSION APPARATUS AND DISPLAY APPARATUS USING THE SAME

BACKGROUND OF THE INVENTION

1. Field of the Invention

The present invention relates to a number-of-pixels conversion apparatus and a display apparatus using the same. More particularly, the invention relates to a number-of-pixels conversion apparatus that interpolates digital data (i.e., pixel data) corresponding to an arbitrary number of pixels, respectively, to display a number-of-pixels-converted version of an image that is represented by the pixel data as well as to a display apparatus using the conversion apparatus.

The above number-of-pixels conversion apparatus and the display apparatus are useful in displaying a number-of-pixels-converted version of an image on a matrix display device in which a number of pixels are arranged two-dimensionally, such as a liquid crystal panel, a plasma display panel (PDP), or a digital micromirror device (DMD).

2. Description of the Related Art

A description will be made of a pixel data conversion method for enlarging or reducing an image at an arbitrary ratio by increasing or decreasing the number of pixels. In the following description, the xy orthogonal coordinate system is used in which the x-coordinate and the y-coordinate correspond to the horizontal direction and the vertical direction, respectively.

FIG. 1 schematically shows a relationship between a pre-conversion image (i.e, on original image) and a post-conversion image. In FIG. 1, mark "○" represents pixel data of the original image and mark "●"represents image regions after the conversion that correspond to the pixel data "○" of the original image. It is assumed that the original image is represented by pixel data that have been obtained by sampling in both of the horizontal and vertical directions and that includes m pixels in the horizontal direction and n pixels in the vertical direction. Consideration will be given to a case of enlarging the original image of m×n pixels to pixel data of M×N pixels that includes M(>m) pixels in the horizontal direction and N (>n) pixels in the vertical direction. In this case, the horizontal enlargement magnification factor is M/m and the vertical enlargement magnification factor is N/n.

In a pixel data interpolation method for the above conversion in the number of pixels, first, inverse mapping is performed which maps post-conversion coordinates to pre-conversion coordinates.

FIG. 2 shows how a pixel D of a post-conversion image is inversely mapped to coordinates in an original image. In FIG. 2, "○" represents pixels of the original and "●" represents pixels of the inversely-mapped post-conversion image. To simplify the description, it is assumed that adjacent pixels of the original image have an interval of a distance "1" in each of the horizontal and vertical directions. Further, a pixel of the original image having coordinates (x, y) is denoted by $d(x, y)$ and its density value is also denoted by $d(x, y)$, where x and y are integers.

As shown in FIG. 2, the pixel D is inversely-mapped to coordinates that divide the region defined by four pixels $d(x, y)$, $d(x+1, y)$, $d(x, y+1)$, and $d(x+1, y+1)$ at a ratio $p:(1-p)$ in the horizontal direction and at a ratio $q:(1-q)$ in the vertical direction. The inversely-mapped pixel D of the post-conversion image has coordinates $(x+p, y+q)$. It is noted that $0 \leq p < 1$ and $0 \leq q < 1$.

In the following description, the pixel D for which interpolation is performed based on density values of the original image is called an interpolation pixel and the four pixels $d(x, y)$, $d(x+1, y)$, $d(x, y+1)$, and $d(x+1, y+1)$ of the original image that are used to determine the density value of the interpolation pixel D are called reference pixels.

The density value of the inversely-mapped interpolation pixel $D(x+p, y+q)$ (in the following description, its density value will also be represented by the same symbol $D(x+p, y+q)$) is given by Equation (1) below by using the density values of the pixels $d(x, y)$, $d(x+1, y)$, $d(x, y+1)$, and $d(x+1, y+1)$ of the four reference pixels $d(x, y)$, $d(x+1, y)$, $d(x, y+1)$, and $d(x+1, y+1)$ located at the four corners around the interpolation pixel D and interpolation coefficients $Hx(p)$, $Gx(p)$, $Hy(q)$ and $Gy(q)$. The interpolation coefficient is a coefficient that indicates to what extent the associated reference pixel contributes to the interpolation pixel.

$$D(x+p, y+q) = Hx(p) \cdot Hy(q) \cdot d(x, y) + Gx(p) \cdot Hy(q) \cdot d(x+, y) \quad (1)$$
$$+ Hx(p) \cdot Gy(q) \cdot d(x, y+1) + Gx(p) \cdot Gy(q) \cdot d(x+1, y+1)$$

where $0 \leq p < 1$ and $0 \leq q < 1$. $Hx(p)$ and $Gx(p)$ are functions of the distance p in the x-direction and $Hy(q)$ and $Gy(q)$ are functions of the distance q in the y-direction. Further, $Hx(p)=1-Gx(p)$ and $Hy(q)=1-Gy(q)$.

An interpolation method satisfying Equation (1) has a feature that the above-described interpolation can easily be performed by combining horizontal interpolation and vertical interpolation, which will be described with reference to FIGS. 3 and 4.

As shown in FIG. 3, first, an imaginary pixel $t(y)$ is assumed that is located from the pixel $d(x, y)$ by a distance p in the horizontal direction. The density value of the pixel $t(y)$ (the density value will be represented by the same symbol $t(y)$ in the following description) can be determined by interpolation based on the density values $d(x, y)$ and $d(x+1, y)$. Similarly, a density value $t(y+1)$ can be determined based on the density values $d(x, y+1)$ and $d(x+1, y+1)$.

Then, as seen from FIG. 4, the density value $D(x+p, y+q)$ of the interpolation pixel that is located from $t(y)$ by a distance q from $t(y)$ in the vertical direction can be determined from the above values $t(y)$ and $t(y+1)$.

This is apparent from the fact that Equation (1) can be modified into Equation (2) below.

$$D(x+p, y+q) = Hy(q) \cdot t(y) + Gy(q) \cdot t(y+1) \ldots (2)$$

where $t(y) = Hx(p) \cdot d(x, y) + Gx(p) \cdot d(x+1, y)$, and
$t(y+1) = Hx(p) \cdot d(x, y+1) + Gx(p) \cdot d(x+1, y+1)$.

In the interpolation method satisfying Equation (1), since the horizontal interpolation and the vertical interpolation are performed in the directions of the coordinate axes that are perpendicular to each other, they can be processed independently of each other. Therefore, the interpolation characteristics of an interpolation method that is a combination of horizontal interpolation and vertical interpolation can be discussed by independently considering a horizontal interpolation characteristic and a vertical interpolation characteristic. For this reason, in the following description, the interpolation characteristic in each of the horizontal and vertical directions is referred to simply as an interpolation characteristic.

An interpolation method called a linear interpolation method will be described below as a first conventional example that satisfies Equation (1). According to the linear interpolation method, the density value of the pixel D can be determined by multiplying the density values d(x, y), d(x+1, y), d(x, y+1), and d(x+1, y+1) of the four corner pixels of the original image around the pixel D by the complements of their distances in the x and y-directions from the pixel D (i.e., values obtained by subtracting those distances from 1) and adding up resulting products. That is, in the linear interpolation method, the density value D of the pixel D is given by Equation (3).

$$D=(1-q)\cdot(1-p)\cdot d(x, y)+(1-q)\cdot p\cdot d(x+1,y) \quad (3)$$
$$+q\cdot(1-p)\cdot d(x, y+1)+q\cdot p\cdot d(x+1, y+1)$$

Equation (3), which represents the density value of the interpolation pixel according to the linear interpolation method, is modified into Equation (4) below.

$$D=(1-q)\{(1-p)\cdot d(x, y)+p\cdot d(x+1, y)\}$$
$$+q\{(1-p)\cdot d(x, y+1)+p\cdot d(x+1, y+1)\} \quad (4)$$

By substituting 1−p=Hx(p), p=Gx(p), 1−q=Hy(q), and q=Gy(q), it is apparent that Equation (4) satisfies Equation (2).

The interpolation coefficients of the linear interpolation method will be described below by using, as an example, the interpolation in the horizontal direction (x-direction) for determining t(y) from d(x, y) and d(x+1, y) that is illustrated in FIG. 3.

FIGS. 5a and 5b show interpolation coefficients Hx(p) and Gx(p) of the linear interpolation method. In the following description, Hx(p) and Gx(p) are written as H and G for the sake of simplification. In FIGS. 5a and 5b, the horizontal axis represents the horizontal distance p between the inversely-mapped interpolation pixel D(x+p, y+q) and the reference pixel d(x, y) and the vertical axis represents the value of the interpolation coefficient H or G. The ordinate H in FIG. 5a is an interpolation coefficient by which to multiply the density value d(x, y) of the reference pixel d(x, y), and the ordinate G in FIG. 5b is an interpolation coefficient by which to multiply the density value d(x+1, y) of the reference pixel d(x+1, y).

As shown in FIG. 5a, the interpolation coefficient H decreases linearly (i.e., at the constant rate) as the distance p between the interpolation pixel D and the reference pixel d(x, y) increases. On the other hand, as shown in FIG. 5b, the interpolation coefficient G decreases linearly (i.e., at the constant rate) as the distance 1−p between the interpolation pixel D and the reference pixel d(x+1, y) increases, that is, as p decreases.

FIG. 6 shows an interpolation characteristic of the linear interpolation method. In FIG. 6, the vertical axis represents the interpolation coefficient and the horizontal axis represents the relative position from the inversely-mapped interpolation pixel D in the coordinates of the original image. The negative side of the horizontal axis corresponds to the interpolation coefficient H, and hence an interpolation coefficient H at an abscissa −p gives an interpolation coefficient by which to multiply d(x, y). The positive side of the horizontal axis corresponds to the interpolation coefficient G, and hence an interpolation coefficient G at an abscissa 1−p gives an interpolation coefficient by which to multiply d(x+1, y). The interpolation characteristic of the linear interpolation method shown in FIG. 6 is symmetrical with respect to the vertical axis.

FIG. 7 shows a number-of-pixels conversion apparatus disclosed in Japanese Unexamined Patent Publication No. Hei. 9-326958 which processes pixel data according to the linear interpolation method. In FIG. 7, 101a–101d denotes memories; 102, an address generation circuit; 103a–103d, 107, and 113, terminals; 104a and 104b, switch circuits; 105, a divider, 106, 109, 112, and 115, latch circuits; 108, 114, 118a, 118b, and 119, adders; 110 and 116 latch circuits that output inverted outputs; 111a–111d and 117a–117d, multipliers; 120 and 121, inversion circuits; 122, a horizontal interpolation coefficient generation circuit; and 123, a vertical interpolation coefficient generation circuit.

The operation of the above conventional number-of-pixels conversion apparatus will be described below.

First, the numbers M and N of pixels in the horizontal direction and the vertical direction, respectively, of a post-conversion image and the numbers m and n of pixels in the horizontal direction and the vertical direction, respectively, of an original image are input from the terminals 103a–103d. The numbers M and N of pixels are supplied to the dividend input terminal of the divider 105 and the numbers m and n of pixels are input to the divisor input terminal of the divider 105. The divider 105 performs division operations according to A=M/m and B=N/n, and determines the reciprocals 1/A and 1/B of the horizontal and vertical conversion ratios.

Reciprocals 1/A of the horizontal conversion ratio are added cumulatively by the latch circuit 109 and the adder 108 of the horizontal interpolation coefficient generation circuit 122, to produce a cumulative conversion ratio Σ(1/A), which is supplied to the address generation circuit 102 and the latch circuit 110. The address generation circuit 102 extracts the integer portion from the cumulative conversion ratio Σ(1/A) and determines the coordinate x of a reference pixel d(x, y) adjacent to an interpolation pixel D. The latch circuit 110 extracts the decimal portion of the cumulative conversion ratio Σ(1/A) and determines an interpolation coefficient p. The interpolation coefficient p is supplied to the multipliers 111a and 111b as well as to the inversion circuit 120. The inversion circuit 120 generates 1−p, which is supplied to the multipliers 111c and 111d.

On the other hand, the reciprocal 1/B of the vertical conversion ratio that is output from the divider 105 is supplied to the vertical interpolation coefficient generation circuit 123, which calculates and outputs a cumulative conversion ratio Σ(1/B). The cumulative conversion ratio Σ(1/B) is supplied to the address generation circuit 102 and the latch circuit 116, which output a coordinate y and an interpolation coefficient q, respectively. The interpolation coefficient q is supplied to the multipliers 111a and 111c and the inversion circuit 121. The inversion circuit 121 generates 1−q, which is supplied to the multipliers 111b and 111d.

The address generation circuit 102 further generates addresses (x, y), x+1, y), (x, y+1), and (x+1, y+1) to be used for reading out the coordinates of four points of the original image. These addresses are supplied to the memories 101a–101d. Pixel data (i.e., density values) d(x, y), d(x+1, y), d(x, y+1), and d(x+1, y+1) of reference pixels are read out from the memories 101a–101d based on the addresses supplied.

The density values d(x, y), d(x+1, y), d(x, y+1), and d(x+1, y+1) are supplied to the multipliers 117d, 117b, 117c, and 117a, respectively. The multipliers 117a–117d and 111a–111d and the adders 118a, 118b, and 119 perform linear interpolation operations, whereby the density value D of the interpolation pixel D is determined.

The linear interpolation method as the first conventional example can produce a smooth enlarging conversion image irrespective of the enlargement magnification factor M/m because the interpolation coefficients H and G vary linearly (i.e., at the constant rate) with the variation of the distance p between the reference pixel d(x, y) and the inversely-mapped interpolation pixel D, as shown in FIGS. 5a and 5b. As for the vertical direction, the linear interpolation method can produce a smooth enlarging conversion image irrespective of the enlargement magnification factor N/n.

On the other hand, the fact that the variation of the interpolation coefficients is linear and small causes a problem that in a region where the density value of the original image has a steep variation, the density value in a corresponding region of the post-conversion image varies too slowly and image blurring occurs there. For example, many of display outputs of PCs (personal computers), WSs (workstations), etc. are images having steep density value variations such as a text image, a figure, and a GUI (graphical user interface) image. The use of the linear interpolation method causes a problem that such images are blurred. In particular, characters and lines are potions where the density value varies steeply. Therefore, those portions tend to be blurred greatly, which hinders the recognition of a display content.

Next, a description will be made of an interpolation method called a zeroth-order holding method as a second conventional example that satisfies the above-mentioned Equation (1) and can inhibit the problem discussed above in the linear interpolation method.

Consider a case of determining t(y) from d(x, y) and d(x+1, y) in the manner as illustrated in FIG. 3. For example, d(x, y) is used as the density value t(y) in a range $0 \leq p<0.5$. On the other hand, d(x+1, y) is used as the density value t(y) in a range $0.5<p \leq 1$. At p=0.5, either of d(x, y) or d(x+1, y) may be used by making a proper definition in advance.

FIGS. 8a and 8b illustrate interpolation coefficients of the zeroth-order holding method. In FIGS. 8a and 8b, the horizontal axis represents the horizontal distance p between the inversely-mapped interpolation pixel D(x+p, y+q) and the reference pixel d(x, y) and the vertical axis represents the value of the interpolation coefficient H or G.

The ordinate H of FIG. 8a is an interpolation coefficient by which to multiply the density value d(x, y) of the pixel d(x, y) of an original image. The ordinate G of FIG. 8b is an interpolation coefficient by which to multiply the density value d(x+1, y) of the pixel d(x+1, y) of the original image. As shown in FIG. 8a, the interpolation coefficient H switches from H=1 to H=0 at p=0.5 as the distance p between the interpolation pixel D and the pixel d(x, y) of the original image increases. On the other hand, as shown in FIG. 8b, the interpolation coefficient G switches from G=1 to G=0 at p=0.5 as the distance 1=p between the interpolation pixel D and the pixel d(x+1, y) of the original image increases, that is, p decreases.

FIG. 9 shows an interpolation characteristic of the zeroth-order holding method. In FIG. 9, the vertical axis represents the interpolation coefficient and the horizontal axis represents the relative position from the coordinate of the inversely-mapped interpolation pixel D. The negative side of the horizontal axis corresponds to the interpolation coefficient H, and the positive side of the horizontal axis corresponds to the interpolation coefficient G. The interpolation characteristic of the zeroth-order holding method shown in FIG. 9 is also symmetrical with respect to the vertical axis.

Image blurring, as occurs in the linear interpolation method, does not occur in the zeroth-order holding method, because the density values themselves of pixels of an original image are used to generate the density value of a pixel of a post-conversion image.

However, in the zeroth-order holding method, the following problem arises when at least one of the horizontal and vertical enlargement magnification factors is not an integer. For example, when the horizontal enlargement magnification factor is 1.25, five pixels of a post-conversion image are generated for four pixels of an original image in the horizontal direction and hence only one of the four pixels of the original image appears twice. In this manner, when an enlarging magnification factor is not an integer, the number of appearances in a post-enlarging image varies depending on the pixel of an original image. This results in deterioration in image quality in the post-enlargement image, for example, the thicknesses of a vertical line and a horizontal line are not uniform, that is, they vary depending on the position in the image or an inclined line loses smoothness.

SUMMARY OF THE INVENTION

The present invention is to provide a number-of-pixels conversion apparatus which interpolates pixel data in displaying a number-of-pixels-converted version of an image including an arbitrary number of pixel data so that the problem that the thicknesses of a vertical line and a horizontal line vary depending on the position in the image or an inclined line loses smoothness can be solved and that a post-conversion image can be displayed that is less blurred even for an original image having steep density variations.

The invention provides a number-of-pixels conversion apparatus for converting the number of pixels of an original image through an interpolation operation at an arbitrary conversion magnification factor, comprising a memory for temporarily storing digital pixel data of the original image; a position information generator for extracting a reference pixel to be used for generating an interpolation pixel through interpolation from pixels of the original image, and for generating address information of the reference pixel and a distance between the interpolation pixel and the reference pixel; a memory controller for reading out pixel data corresponding to the reference pixel from the memory based on the address information generated by the position information generator; an interpolation coefficient generator for generating an interpolation coefficient that is obtained by a function with the distance between the interpolation pixel and the reference pixel in accordance with the distance information generated by the position information generator, said function having a first derivative that is smaller than −1 at least in a partial range; and an interpolation operation device for performing an interpolation operation based on the pixel data corresponding to the reference pixel read out by the memory controller and the interpolation coefficient generated by the interpolation coefficient generator.

The invention provides a number-of-pixels conversion apparatus, comprising an interpolation coefficient generator, operable to generate an interpolation coefficient generator, operable to generate an interpolation coefficient based on a distance between a reference pixel and an interpolation pixel; and an interpolator, operable to perform interpolation, based on the interpolation coefficient and pixel data of the reference pixel; wherein the interpolation coefficient is a function of the distance between the reference pixel and the interpolation pixel, the function having a first derivative that is smaller than −1 at least in a partial range.

The present invention is to also provide a display apparatus which displays a number-of-pixels-converted version of an image including an arbitrary number of pixel data in such a manner that the problem that the thicknesses of a vertical line and a horizontal line vary depending on the position in the image or an inclined line loses smoothness can be solved and that a post-conversion image can be displayed that is less blurred even for an original image having steep density variations.

The present invention also provides a display apparatus which converts the number of pixels of an original image through an interpolation operation at an arbitrary conversion magnification factor and displays a post-conversion image, comprising a memory for temporarily storing digital pixel data of the original image; a position information generator for extracting a reference pixel to be used for generating an interpolation pixel through interpolation from pixels of the original image, and for generating address information of the reference pixel and a distance between the interpolation pixel and the reference pixel; a memory controller for reading out pixel data corresponding to the reference pixel from the memory based on the address information generated by the position information generator; an interpolation coefficient generator for generating an interpolation coefficient that is obtained by a function with the distance between the interpolation pixel and the reference pixel in accordance with the distance information generated by the position information generator, said function having a first derivative that is smaller than −1 at least in a partial range; an interpolation operation device for performing an interpolation operation based on the pixel data corresponding to the reference pixel read out by the memory controller and the interpolation coefficient generated by the interpolation coefficient generator; and a display device for displaying an image based on an output of the interpolation operation device.

The present invention also provides a display apparatus, comprising an interpolation coefficient generator, operable to generate an interpolation coefficient based on a distance between a reference pixel and an interpolation pixel; and interpolator, operable to perform interpolation based on the interpolation coefficient and pixel data of the reference pixel; and a display, operable to display an image based on pixel data created using the interpolation coefficient; wherein the interpolation coefficient is a function of the distance between the reference pixel and the interpolation pixel, the function having a first derivative that is smaller than −1 at least in a partial range.

Other features of the present invention will become understood from the following description with reference to the accompanying drawings.

DETAILED DESCRIPTION OF THE PREFERRED EMBODIMENTS

The preferred embodiments of the present invention will now be described.

Embodiment 1

First, a description will be made of interpolation coefficients that are used in a number-of-pixels conversion apparatus according to a first embodiment of the invention.

The first embodiment of the invention utilizes interpolation coefficients that satisfy Equations (5) and (6) below.

First, interpolation coefficients $Hx(p)$ and $Gx(p)$ satisfy Equations (5) below.

$$Hx(p)=1-p^K$$

$$Gx(p)=1-Hx(p)=p^K\ldots \quad (5)$$

Interpolation coefficients $Hy(q)$ and $Gy(q)$ satisfy Equations (6) below.

$$Hy(q)=1-q^K$$

$$Gy(q)=1-Hy(q)=q^K\ldots \quad (6)$$

In the above equations, p is the distance in the x-direction between the interpolation pixel $D(x+p, y+q)$ and the reference pixel $d(x, y)$, q is the distance in the y-direction between the interpolation pixel $D(x+p, y+q)$ and the reference pixel $d(x, y)$; and K is a positive constant number (but not 1).

Figure 1:
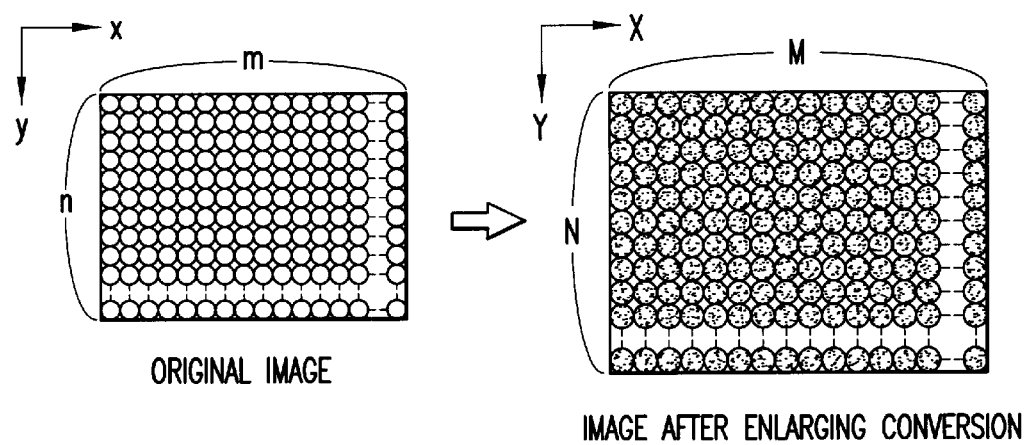
FIG. 1 schematically shows a relationship between a pre-conversion image (i.e., an original image) and a post-conversion image.
Figure 2:
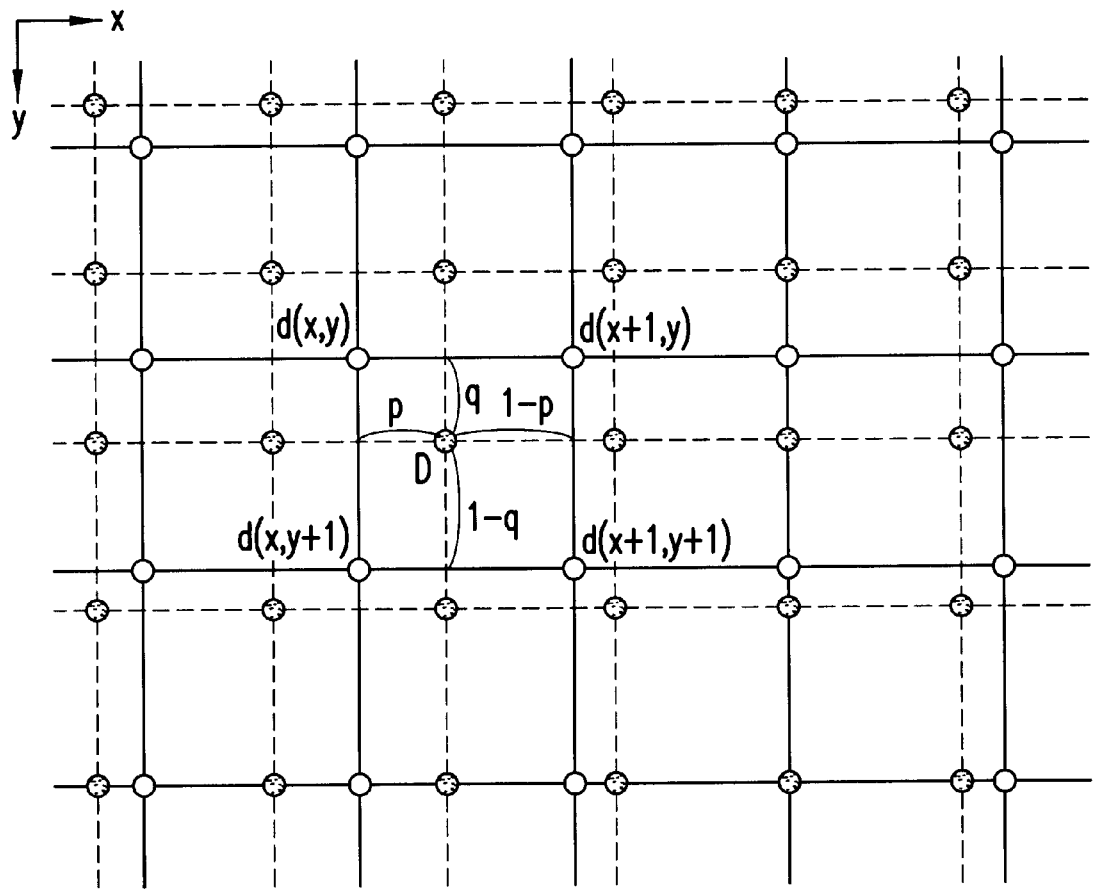
FIG. 2 illustrates inverse mapping.
Figure 3:
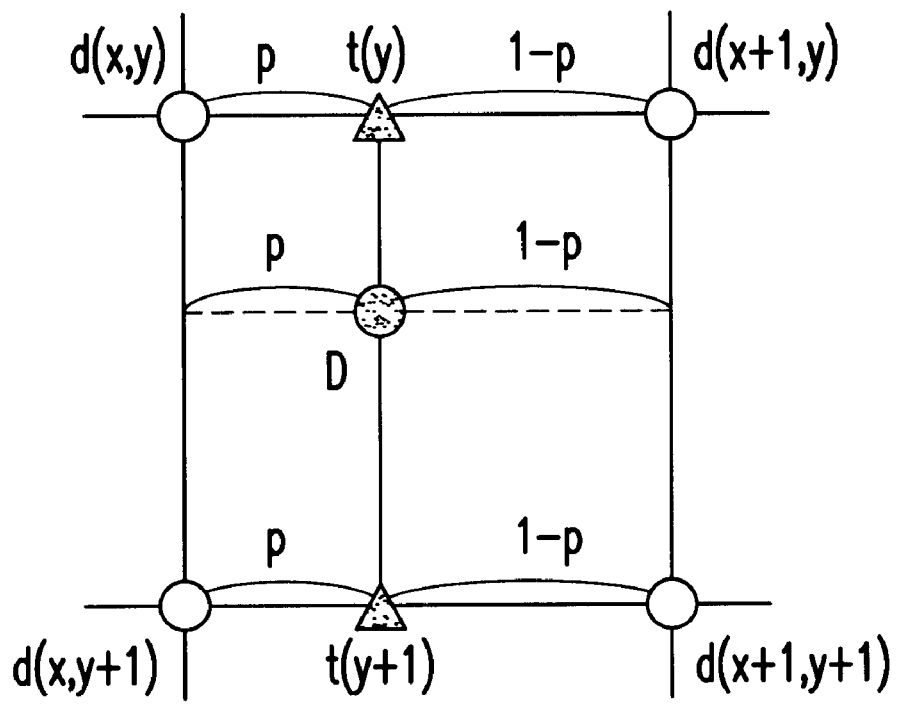
FIG. 3 illustrates horizontal interpolation in which the horizontal interpolation and vertical interpolation are performed independently.

Next, a description will be made of the horizontal interpolation for determining $t(y)$ from $d(x, y)$ and $d(x+1, y)$ in the manner as illustrated in FIG. 3.

Figure 10A:
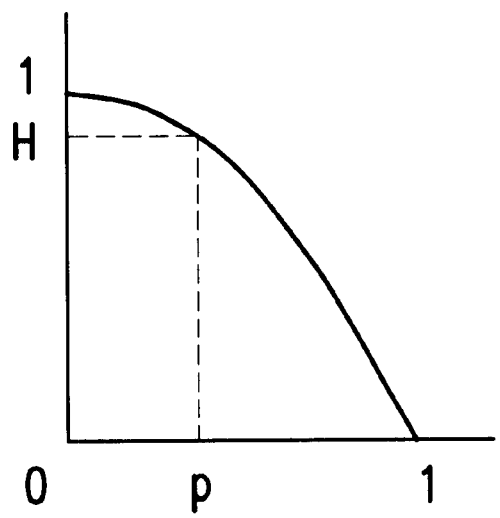
FIGS. 10a and 10b illustrate interpolation coefficients used in a number-of-pixels conversion apparatus according to a first embodiment of the present invention.
Figure 10B:
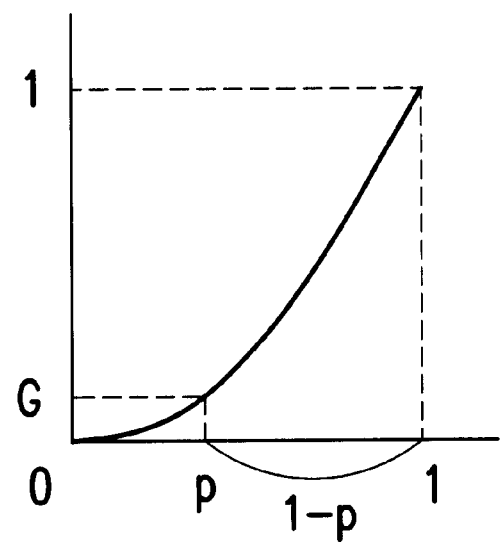

FIGS. 10a and 10b illustrate interpolation coefficients $Hx(p)$ and $Gx(p)$ used in the invention that satisfy Equation (5). In the following description, $Hx(p)$ and $Gx(p)$ will be written as H and G for the sake of simplification. In FIGS. 10a and 10b, the horizontal axis represents the horizontal distance p between the inversely-mapped interpolation pixel $D(x+p, y+q)$ and the reference pixel $d(x, y)$ and the vertical axis represents the value of the interpolation coefficient H or G.

The ordinate H in FIG. 10a is an interpolation coefficient by which to multiply the density value $d(x, y)$ of the reference pixel $d(x, y)$, and the ordinate G in FIG. 10b is an interpolation coefficient by which to multiply the density value $d(x+1, y)$ of the reference pixel $d(x+1, y)$.

As shown in FIG. 10a, the interpolation coefficient H decreases monotonously as the distance p between the interpolation pixel D and the reference pixel $d(x, y)$ increases. The slope of H is smaller than −1 in a range of p that is close to 1. On the other hand, as shown in FIG. 10b, the interpolation coefficient G increases monotonously as the distance p increases. The slop of G is greater than 1 in a range of p that is close to 1. In other words, it can be said that G decreases monotonously as the distance 1−p between the interpolation pixel D and the reference pixel $d(x+1, y)$ increases that is, as p decreases.

Figure 4:
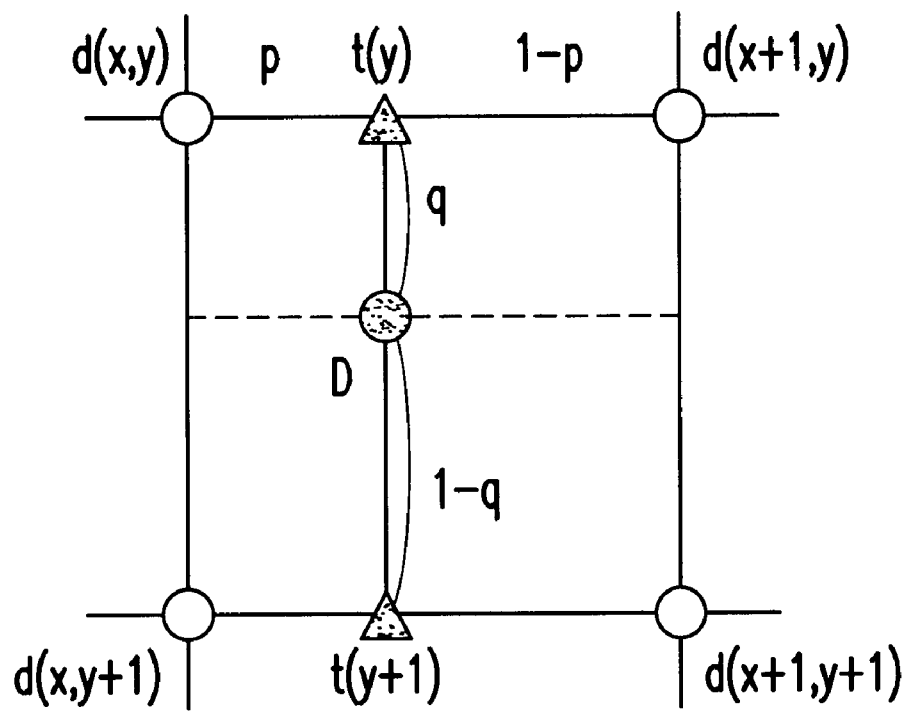
FIG. 4 illustrates the vertical interpolation in which the horizontal interpolation and vertical interpolation are performed independently.
Figure 5A:
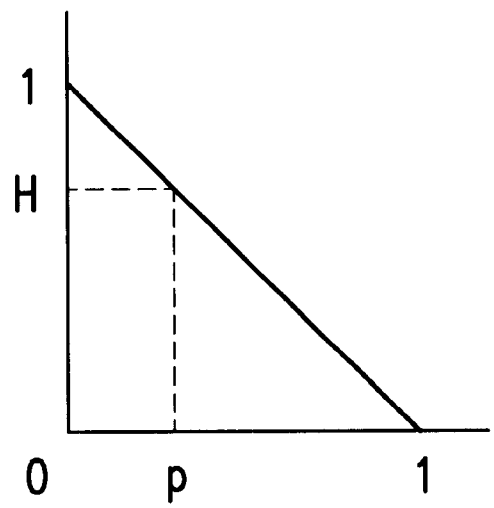
FIGS. 5a and 5b illustrate interpolation coefficeintly in a linear interpolation method.
Figure 5B:
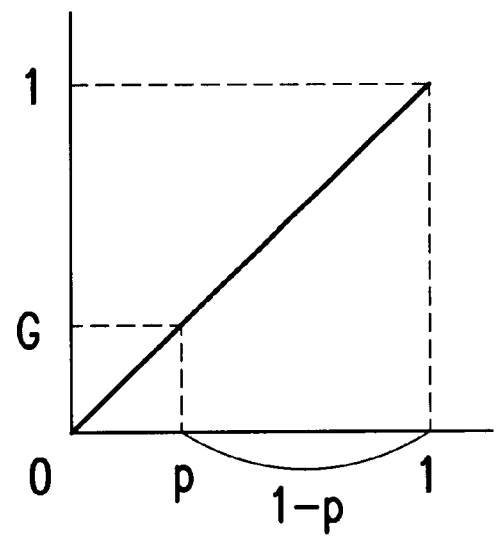
Figure 6:
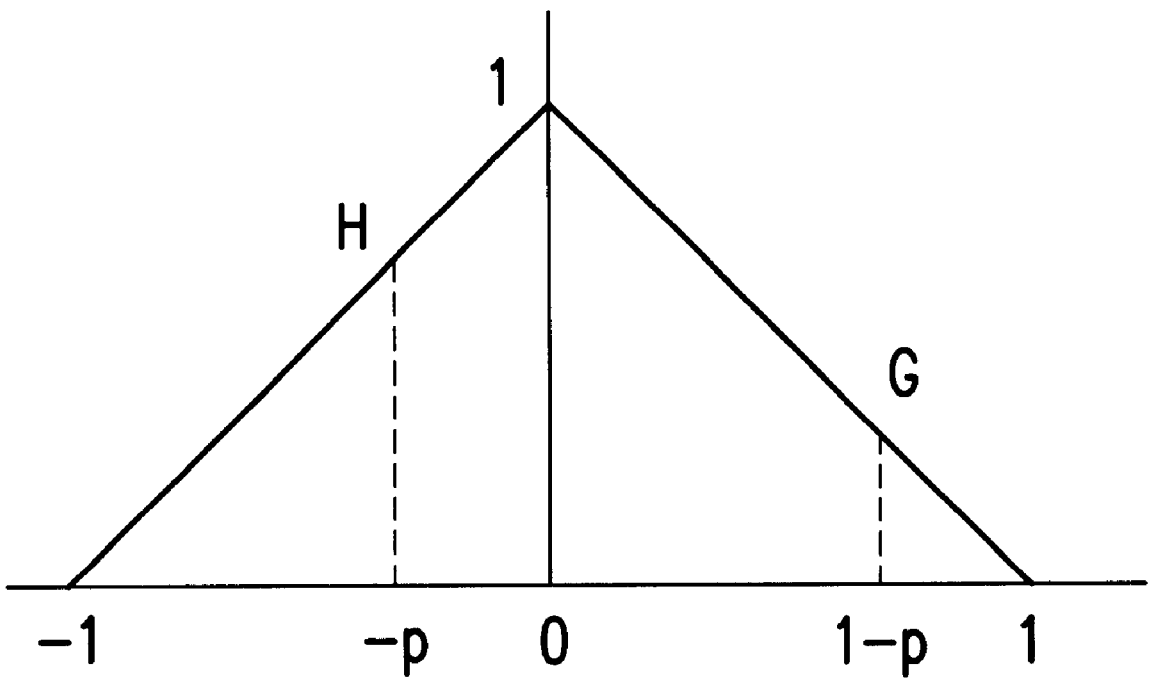
FIG. 6 shows an interpolation characteristic of the linear interpolation method.
Figure 7:
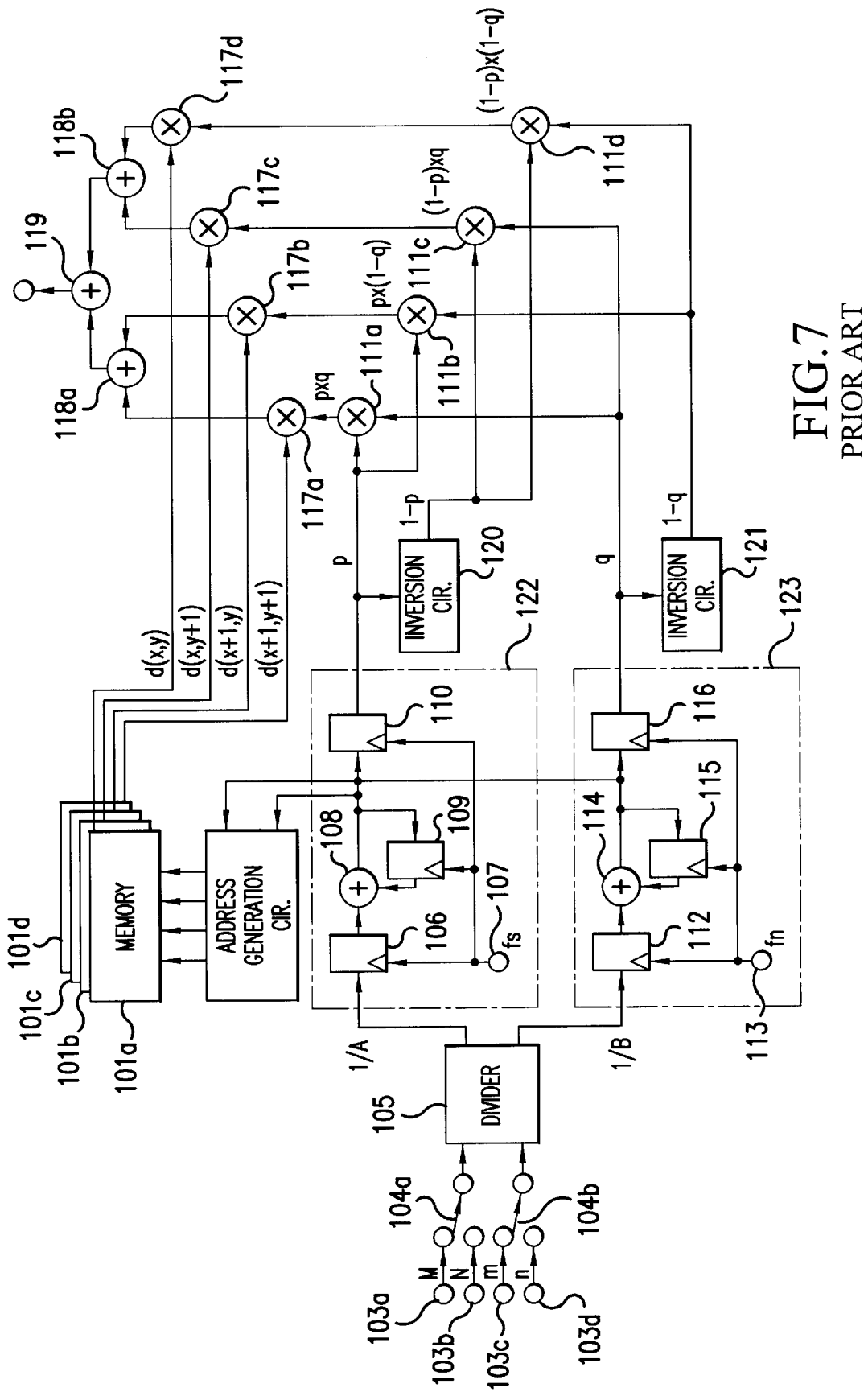
FIG. 7 shows an example of a number-of-pixels conversion apparatus using the linear interpolation method.
Figure 8A:
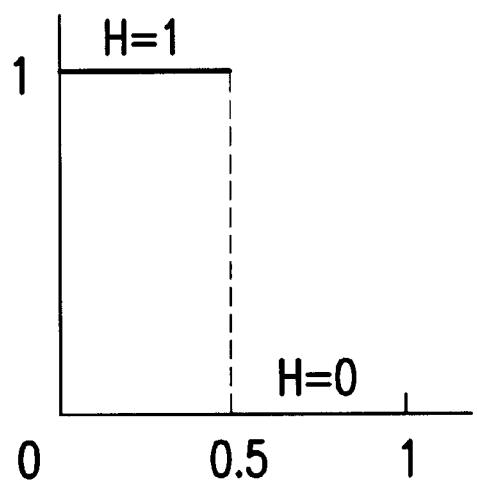
FIGS. 8a and 8b illustrate interpolation coefficients of a zeroth-order holding method.
Figure 8B:
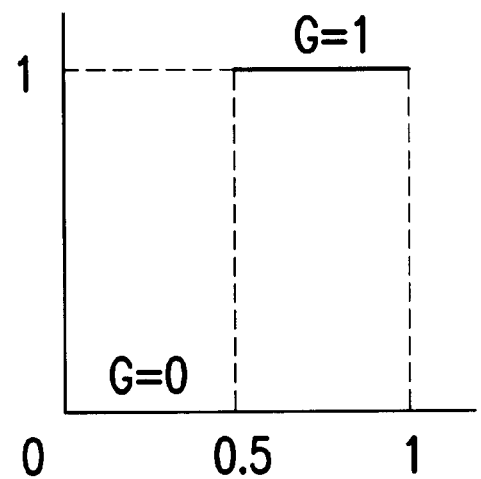
Figure 9:
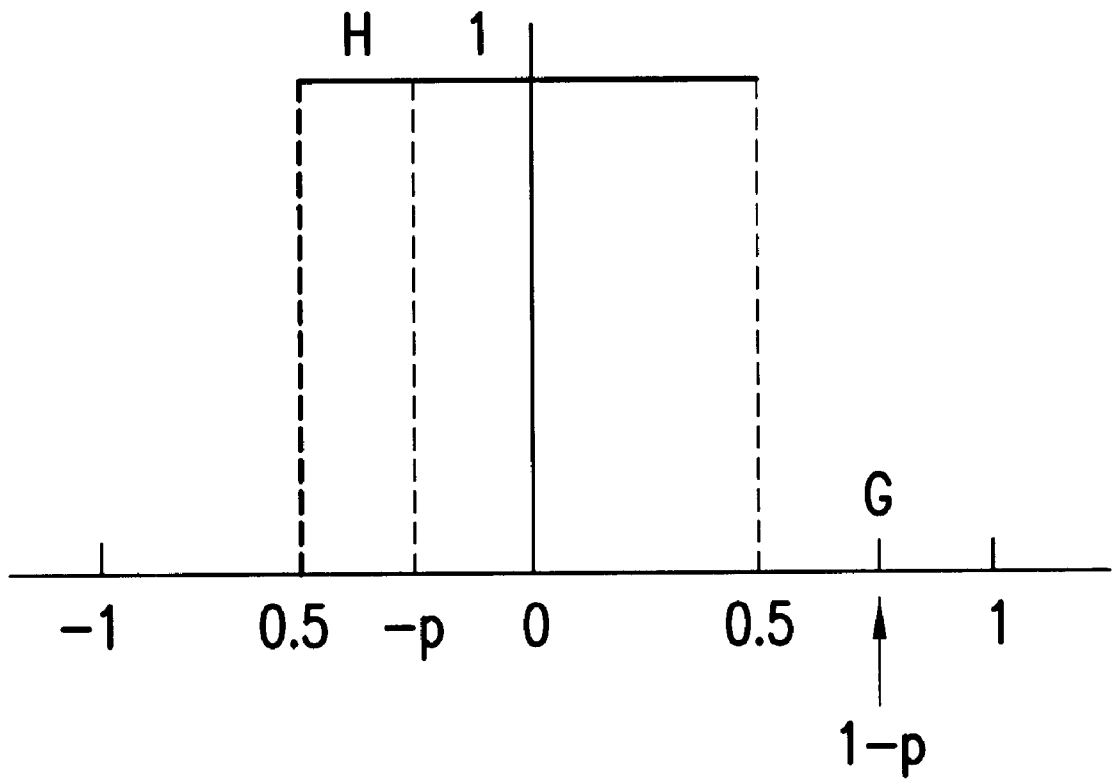
FIG. 9 shows an interpolation characteristic of the zeroth-order holding method.

The vertical interpolation for determining $D(x+p, x+q)$ from $t(y)$ and $t(y+1)$ in the manner as illustrated in FIG. 4 can be performed by executing, in the vertical direction, a process similar to the above horizontal interpolation by using Equation (6). Therefore, it is not described in detail here.

As shown in FIGS. 10a and 10b, the interpolation coefficients H and G vary steeply in the range of p or q (parameter L) that is close to 1. Since the proportion of contribution of a reference pixel to the interpolation pixel varies steeply in the above range of L, the blurring that occurs in the linear interpolation method as the first conventional example can be inhibited, whereby a less burred post-conversion image can be obtained.

Figure 11:
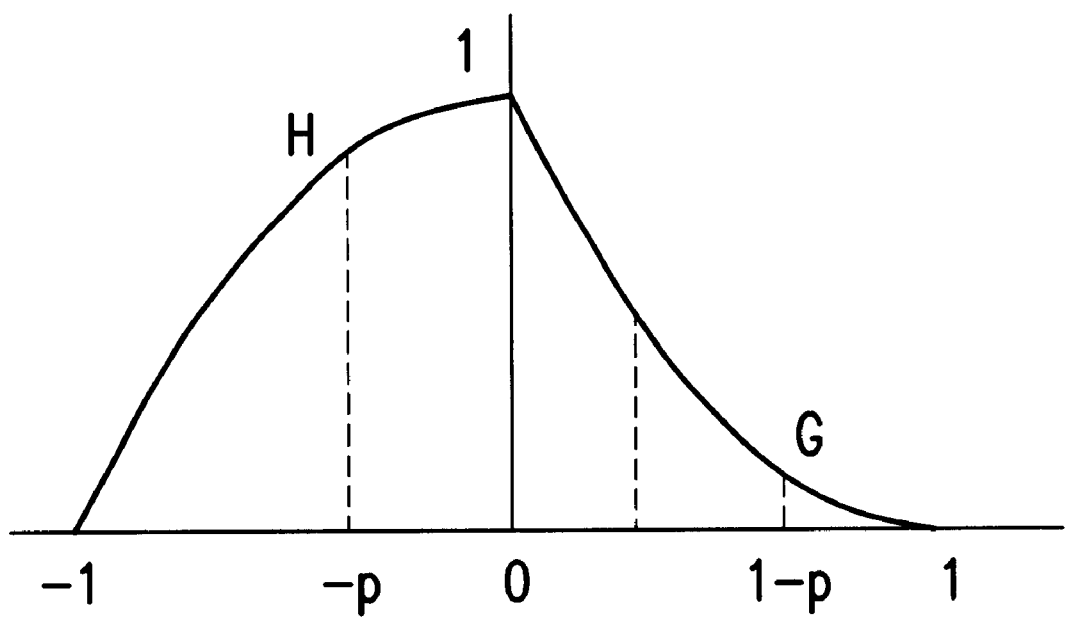
FIG. 11 shows an interpolation characteristic of the number-of-pixels conversion apparatus according to the first embodiment.

FIG. 11 shows an interpolation characteristic of this embodiment. In FIG. 11, the vertical axis represents the interpolation coefficient and the horizontal axis represents the relative position from the inversely-mapped interpolation pixel D in the coordinates of an original image. The negative side of the horizontal axis corresponds to the interpolation coefficient H, and hence an interpolation coefficient H at an abscissa -p gives an interpolation coefficient by which to multiple $d(x, y)$. The positive side of the horizontal axis corresponds to the interpolation coefficient G, and hence an interpolation coefficient G at an abscissa 1 - p gives an interpolation coefficient by which to multiply $d(x+1, y)$.

As shown in FIG. 11, the interpolation characteristics of this embodiment is asymmetrical with respect to the vertical axis. In the following description, this type of interpolation characteristic is referred to simply as an asymmetrical interpolation characteristic.

In the interpolation method having such an asymmetrical interpolation characteristic, the contribution of reference pixels to the interpolation pixel is not uniform. Therefore, it is possible to inhibit such a disadvantage of the linear interpolation method that, for example, the corresponding line in a post-conversion image is recognized as a thick line when pixel data of a thin line is converted.

A number-of-pixels conversion apparatus that uses the interpolation method having the above interpolation characteristic will be described below.

Figure 12:
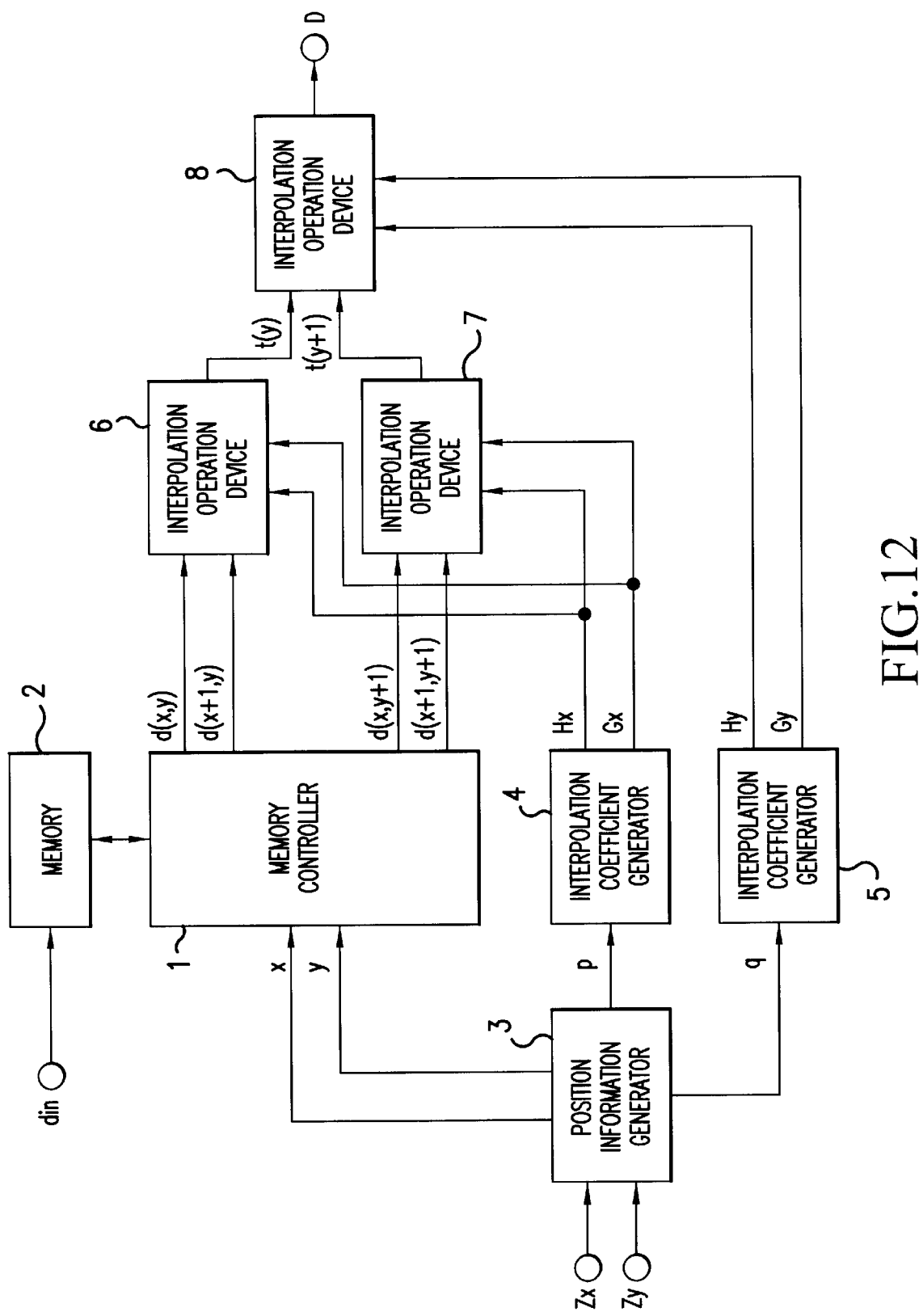
FIG. 12 is a block diagram showing the configuration of the number-of-pixels conversion apparatus according to the first embodiment.

FIG. 12 is a block diagram showing a number-of-pixels conversion apparatus according to the first embodiment of the invention. In FIG. 12, reference numeral 1 denotes a memory controller; 2, a memory; 3, a position information generator; 4 and 5, interpolation coefficient generators; and 6–8, interpolation operation devices.

Figure 13:
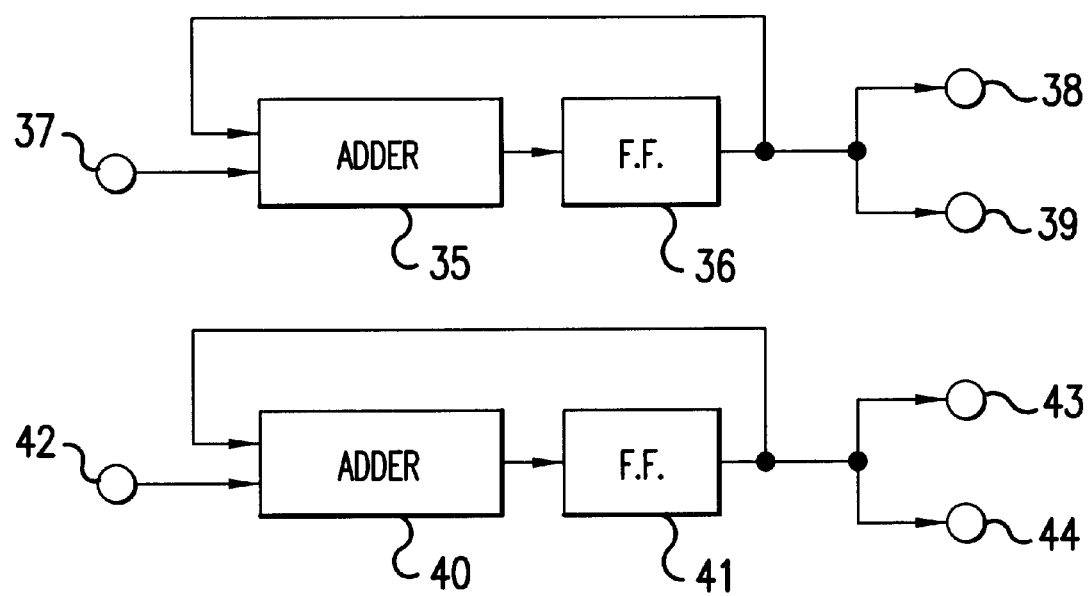
FIG. 13 is a block diagram showing the configuration of a position information generator in the number-of-pixels conversion apparatus according to the first embodiment.

FIG. 13 is a block diagram showing a specific configuration example of the position information generator 3 shown in FIG. 12. In FIG. 13, reference numeral 35 denotes an adder; 36, a flip-flop (FF); 37–39, terminals; 40, an adder; 41, a flip-flop; and 42–44, terminals.

Figure 14:
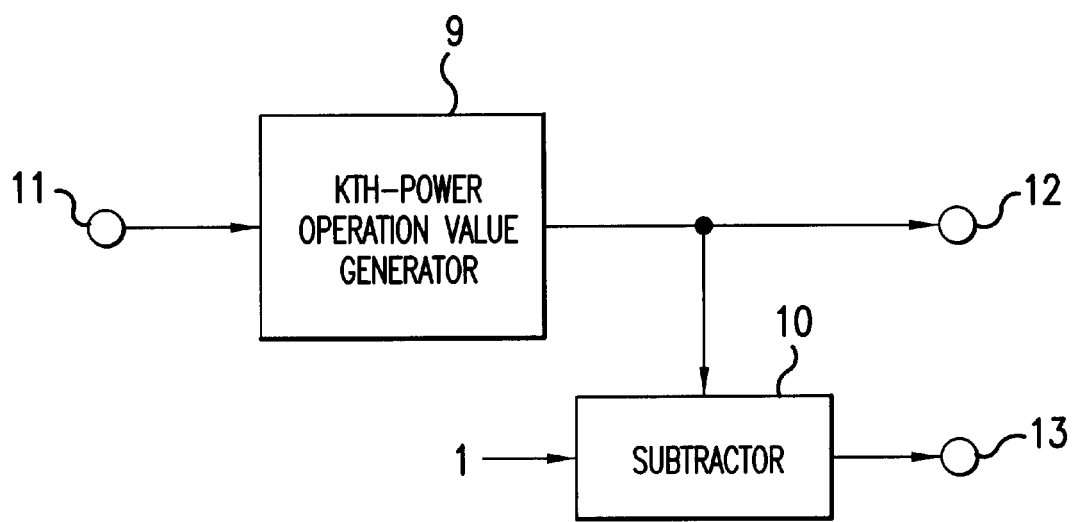
FIG. 14 is a block diagram showing the configuration of an interpolation coefficient generator in the number-of-pixels conversion apparatus according to the first embodiment.

FIG. 14 is a block diagram showing a specific configuration example of each of the interpolation coefficient generators 4 and 5 shown in FIG. 12, which generates interpolation coefficients according to Equations (7) below.

$$H = 1 - L^K$$
$$G = 1 - H = L^K \ldots \quad (7)$$

where L is the distance between the interpolation pixel and the reference pixel (i.e., p or q) and K is a positive constant number (but not 1). In FIG. 14, reference numeral 9 denotes a Kth-power operation value generator, 10 denotes a subtractor, and 11–13 denote terminals.

Figure 15:
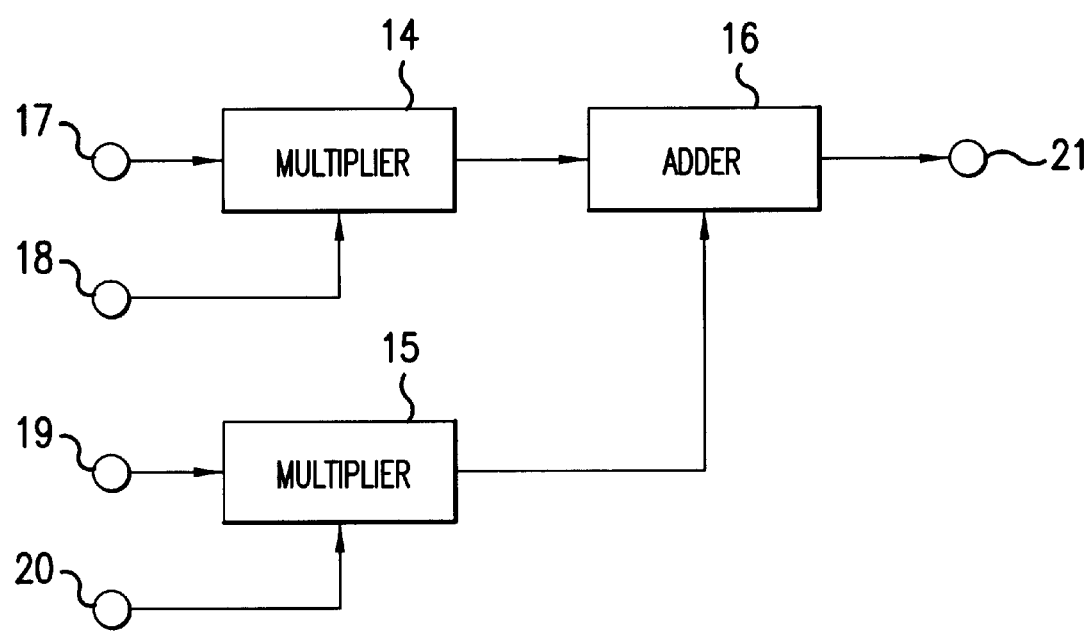
FIG. 15 is a block diagram showing the configuration of an interpolation operation device in the number-of-pixels conversion apparatus according to the first embodiment.

FIG. 15 is a block diagram showing a specific configuration example of each of the interpolation operation devices 6–8 shown in FIG. 12. In FIG. 15, reference numerals 14 and 15 denote multipliers; 16 denotes an adder; and 17–21 denote terminals.

Next, the operation of the number-of-pixels conversion apparatus according to this embodiment will be described with reference to FIGS. 12–16.

First, as shown in FIG. 12, pixel data $d_{in}$ of an original image are temporarily stored in the memory 2. Magnification information Z (Zx, Zy) that are the reciprocals of enlargement magnification factors are input to the position information generator 3.

The position information generator 3 generates, in accordance with the magnification information Z (Zx, Zy), address information (x, y) in the horizontal and vertical directions that specify a reference pixel to be used for an interpolation operation and a horizontal distance p and a vertical distance q between the reference pixel d(x, y) located at the address (x, y) and an interpolation pixel D(x+p, y+q). The address information (x, y) is supplied to the memory controller 1. The horizontal distance p and the vertical distance q are supplied to the interpolation coefficient generators 4 and 5, respectively.

Next, the operation of the position information generator 3 will be described in detail with reference to FIG. 13.

In this embodiment, the magnificent information Zx is input from the terminal 37 as a parameter representing the reciprocal of a horizontal enlargement magnification factor. The adder 35 adds together the reciprocal Zx of the enlargement magnification factor and an output of the flip-flop 36, and an addition result is supplied to the flip-flop 36. The addition result is output from the flip-flop 36 in synchronism with a clock for each pixel data of a post-enlarging-conversion image, and supplied to the adder 35. By repeating the above operations, reciprocals Zx of horizontal enlargement magnification factor are cumulatively added by the adder 35 and the flip-flop 36.

The integer portion of the output of the flip-flop 36 is output from the terminal 38 as horizontal address information x of reference pixel data to be used for interpolation, and supplied to the memory controller 1. On the other hand, the decimal portion of the output of the flip-flop 36 is output from the terminal 39 as p that represents the distance between the horizontal coordinate x and the position of the interpolation pixel, and supplied to the interpolation coefficient generator 4.

The magnification information Zy is input from the terminal 42 as a parameter representing the reciprocal of a vertical enlargement magnification factor. The adder 40 adds together the reciprocal Zy of the enlargement magnification factor and an output of the flip-flop 41, and an addition result is supplied to the flip-flop 41. The addition result is output from the flip-flop 41 every 1-line scanning period of the post-conversion image, and supplied to the adder 40. By repeating the above operations, reciprocals Zy of vertical enlargement magnification factor are added up cumulatively by the adder 40 and the flip-flop 41.

The integer portion of the output of the flip-flop 41 is output from the terminal 43 as vertical address information y of reference pixel data to be used for interpolation, and supplied to the memory controller 1. On the other hand, the decimal portion of the output of the flip-flop 41 is output from the terminal 44 as q that represents the distance between the vertical coordinate y and the position of the interpolation pixel, and supplied to the interpolation coefficient generator 5.

Figure 16:
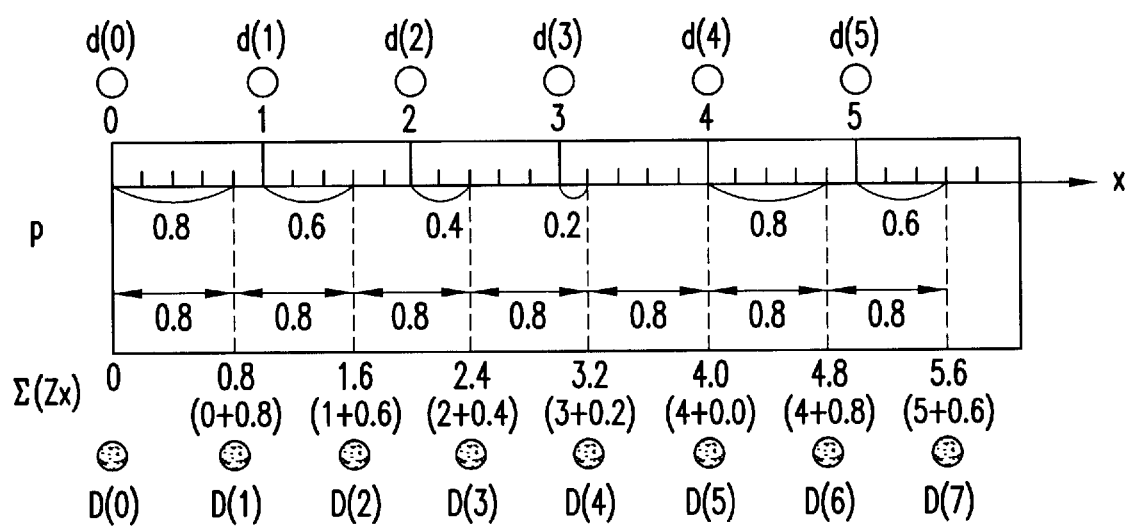
FIG. 16 shows an example of inversely mapping pixels of a post-conversion image to coordinates x of an original image.

FIG. 16 shows, for the horizontal direction, an example of inversely mapping pixels of a post-conversion image to coordinates x of an original image in a case where the horizontal enlargement magnification factor is 1.25. In FIG. 16, "O" represents pixels of an original image that are denoted in order by d(0), d(1), d(2), d(3), d(4), d(5), . . . starting from the pixel located at a coordinate x=0 of the original image. "●" represents interpolation pixels D of a post-conversion image obtained by performing a 1.25-fold enlarging conversion on the original image. The interpolation pixels D are inversely mapped to the coordinates of the original image as shown in FIG. 16. The pixels of the post-conversion image are denoted in order by D(0), D(1), D(2), D(3), D(4), D(5), . . . from the pixel located at the coordinate x=0 of the original image.

As described above, to inversely map the pixels D of a post-conversion image to the coordinates of an original image in the case where the enlargement magnification factor is 1.25, it is necessary to change the interval between pixels by a factor of 1/1.25. Therefore, the pixels D of the post-conversion image are inversely mapped so as to have an interval that is equal to the reciprocal Zx of the enlargement magnification factor (Zx=1/1.25=0.8). For example, the post-conversion pixel D(1) is inversely mapped to a position x=0.7, (D(2) to x=0.8×2=1.6, and D(3) to x=0.8× 3=2.4.

It is understood from the above that the positions to which the post-conversion pixels D are inversely mapped are positions having, as x-coordinates, cumulative addition results of the reciprocal Zx=0.8 of the enlargement magnification factor.

In FIG. 16, $\Sigma(Zx)$ represents a value obtained by cumulative adding reciprocals of the horizontal enlargement magnification factor and the integer portion and the decimal portion of $\Sigma(Zx)$ are separately shown in parentheses. The parameter p is the decimal portion of a cumulative addition value of Zx and represents the distance between the interpolation pixel and the corresponding reference pixel.

For example, the integer portion "0" of the x-coordinate (x=0.8) of the post-conversion pixel D(1) indicates that the pixels of the original image that are located ahead of and behind D(1) are d(0) and d(1). The decimal portion "0.8" indicates that the distance between the inversely-mapped interpolation pixel D(1) and the reference pixel d(0) of the original image is 0.8. Similarly, the integer portion "1" of the x-coordinate (x=1.6) of D(2) indicates that the pixels of the original image ahead of and behind D(2) are d(1) and d(2), and the decimal portion "0.6" indicates that the distance between the interpolation pixel D(2) and the reference pixel d(1) of the original image is 0.6.

In this manner, by determining a cumulative addition value $\Sigma(Zx)$ of the reciprocal Zx of the enlargement magnification factor, the horizontal address information x of a reference pixel that is necessary for interpolation is obtained from the integer portion of the cumulative addition value Σ(Zx) and the horizontal distance p between the corresponding interpolation pixel and the above reference pixel can be obtained from the decimal portion.

As for the vertical direction, address information y and the distance q between an interpolation pixel and a reference pixel can be obtained according to a similar procedure.

As described above, by constructing the position information generator 3 in the manner shown in FIG. 13, address information (x, y) of a reference pixel and the distances p and q between an interpolation pixel and the reference pixel can be determined for an arbitrary enlargement magnification factor.

Returning to FIG. 12, and the description of the number of pixels conversion apparatus of this embodiment, the memory controller 1 reads out d(x, y), d(x+1, y), d(x, y+1), and d(x+1, y+1) from the memory 2 as pixel data of reference pixels based on the address information (x, y) that is supplied from the position information generator 3. And the memory controller 1 supplies d(x, y) and d(x+1, y) to the interpolation operation device 6 and d(x, y+1) and d(x+1, y+1) to the interpolation operation device 7.

Next, the operation of the interpolation coefficient generator 4 which receives the horizontal distance p from the position information generator 3 will be described with reference to FIG. 14.

The horizontal distance p that has been generated by the position information generator 3 is input from the terminal 11 and supplied to the Kth-power operation value generator 9. The Kth-power operation value generator 9 generates the Kth power of p, which is supplied to the subtractor 10 as well as output from the terminal 12. The subtractor 10 subtracts the Kth power of p from a constant "1" and a subtraction result is output from the terminal 13.

Outputs from the terminals 13 and 12 have values obtained by substituting L=p into Equations (7) and are supplied, as respective horizontal interpolation coefficients Hx and Gx, to each of the interpolation operation device 6 and 7.

The operation of the interpolation coefficient generator 5 which receives the vertical distance q from the position information generator 3 will be described with reference to FIG. 14.

The vertical distance q that has been generated by the position information generator 3 is input from the terminal 11 and supplied to the Kth-power operation value generator 9. The Kth-power operation value generator 9 generates the Kth power of q, which is supplied to the subtractor 10 as well as output from the terminal 12. The subtractor 10 subtracts the Kth power of q from a constant "1" and a subtraction result is output from the terminal 13.

Outputs from the terminals 13 and 12 have values obtained by substituting L=q into Equations (7) and are supplied to the interpolation operation device 8 as respective vertical interpolation coefficients Hy and Gy.

Next, the operation of the interpolation operation device 6 will be described with reference to FIG. 15. The reference pixel data d(x, y) and d(x+1, y) that have been generated by the memory controller means 1 are input from the respective terminals 17 and 19 and supplied to the respective multipliers 14 and 15. The horizontal interpolation coefficients Hx and Gx that have been generated by the interpolation coefficient generator 4 are input from the respective terminals 18 and 20 and supplied to the respective multipliers 14 and 15.

Based on the reference pixel data d(x, y) and the interpolation coefficient Hx, the multiplier 14 generates a multiplication result Hx·d(x, y), which is supplied to the adder 16. On the other hand, based on the reference pixel data d(x+1; y) and the interpolation coefficient Gx, the multiplier 15 generates a multiplication result Gx·d(x+1,y), which is supplied to the adder 16.

The adder 16 generates an addition result Hx·d(x, y)+Gx·d(x+1,y) based on the multiplication results Hx·d(x, y) and Gx·d(x+1, y). This addition result is output from the terminal 21 as a horizontal interpolation operation result t(y) for the reference pixels d(x, y) and d(x+1, y) and supplied to the interpolation operation device 8.

Next, the operation of the interpolation operation device 7 will be described with reference to FIG. 15. The reference pixel data d(x, y+1) and d(x+1, y+1) that have been generated by the memory controller 1 are input from the respective terminals 17 and 19 and supplied to the respective multipliers 14 and 15. The horizontal interpolation coefficients Hx and Gx that have been generated by the interpolation coefficient generator 4 are input from the respective terminals 18 and 20 and supplied to the respective multipliers 14 and 15.

Based on the reference pixel data d(x, y+1) and the interpolation coefficient Hx, the multiplier 14 generates a multiplication result Hx·d(y, y+1), which is supplied to the adder 16. On the other hand, based on the reference pixel data d(x+1, y+1) and the interpolation coefficient Gx, the multiplier 15 generates a multiplication result Gx·d(x+1, y+1), which is supplied to the adder 16.

The adder 16 generates an addition result Hx·d(x, y+1)+Gx·d(x+1, y+1) based on the multiplication results Hx·d(x, y+1) and Gx·d(x+1, y+1). This addition result is output from the terminal 21 as a horizontal interpolation operation result t(y+1) for the reference pixels d(x, y+1) and d(x+1, y+1) and supplied to the interpolation operation device 8.

Next, the operation of the interpolation operation device 8 will be described with reference to FIG. 15. The horizontal interpolation operation results t(y) and t(y+1) are input from the respective terminals 17 and 19 and supplied to the respective multipliers 14 and 15. The vertical interpolation coefficients Hy and Gy that have been generated by the interpolation coefficient generators 5 are input from the respective terminals 18 and 20 and supplied to the respective multipliers 14 and 15.

Based on the horizontal interpolation operation result t(y) and the interpolation coefficient Hy, the multiplier 14 generates a multiplication result Hy t(y), which is supplied to the adder 16. On the other hand, based on the horizontal interpolation operation result t(y+1) and the interpolation coefficient Gy, the multiplier 15 generates a multiplication result Gy·t(y+1), which is supplied to the adder 16.

The adder 16 generates an addition result Hy·t(y)+Gy·t(y+1) based on the multiplication results Hy·t(y) and Gy·t(y+1). This addition result is output from the terminal 21. This addition result is a vertical interpolation operation result for the horizontal interpolation operation results t(y) and t(y+1), that is, the density value of the interpolation pixel D. The density value D of the post-conversion interpolation pixel D has thus been generated.

Figure 17:
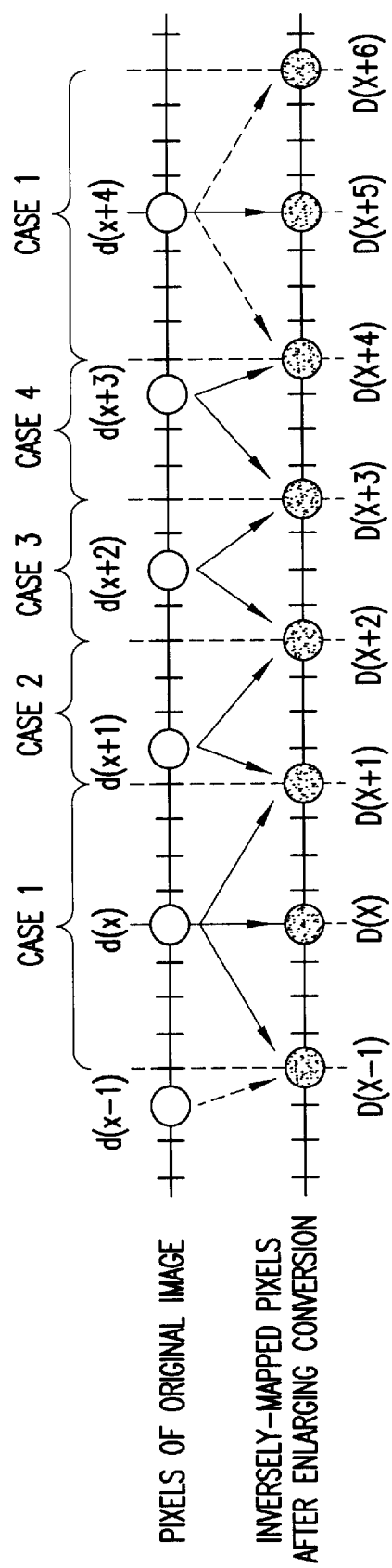
FIG. 17 shows a positional relationship between pixels of an original image and pixels of a post-conversion image.

FIG. 17 shows an example of horizontal enlarging conversion with an enlargement magnification factor of 1.25. "O" represents pixels of an original image and "●" represents pixels of a post-enlarging-conversion image that are inversely mapped to coordinates in the original image.

Parameter x represents a horizontal coordinate in the original image and d(x) represents pixel data of a reference pixel at the coordinate x. On the other hand, X represents a horizontal coordinate in the post-enlargement-conversion image and D(X) represents pixel data of an interpolation pixel at the coordinate X.

As described above, as in the case of the first and second conventional examples, in the present invention the horizontal and vertical interpolation characteristics can be handled independently of each other. Therefore, for the sake of simplicity, here the description is directed to only the horizontal direction and the description for the vertical direction is omitted.

The pixels of the post-conversion image are inversely mapped to coordinates x in the original image so as to have intervals of 1/1.25=0.8 that is the reciprocal of the enlargement magnification factor. For example, if it is assumed that D(X) is a pixel of the post-conversion image that is inversely mapped to the position having a coordinate x in the original image, D(X+1) and D(X+2) are inversely mapped to coordinates (x +0.8) and (x+1.6), respectively.

The density value D(X+1) of the pixel D(X+1) of the post-conversion image is determined by interpolation using, the pixels d(x) and d(x+1) of the original image as reference pixels, and the density value D(X+2) is determined by interpolation using the pixels d(x+1) and d(x+2) as reference pixels. Conversely, it can be said that the pixel d(x+1) of the original image contributes to the pixels D(X+1) and D(X+2) of the post-conversion image. The degree of contribution can be determined as an interpolation coefficient based on the distance between the pixel of the original image and the inverse mapping position.

The pixel d(x) of the original image contributes to three pixels of the post-conversion image, that is, D(X−1), D(X), and D(X+1). These post-conversion pixels D(X−1), D(X), and D(X+1) are inversely mapped so as to have x-coordinates, with respect to the pixel d(x) of the original image, of 0.8 on the negative side (hereinafter written as −0.8), 0, and 0.8 on the positive side (hereinafter written simply as 0.8). This type of positional relationship between the reference pixel and the interpolation pixels is called case-1.

The pixel d(x+1) of the original image contributes to the pixels D(X+1) and D(X+2) of the post-conversion image. The relative positions, with respect to d(x+1), of these post-conversion pixels D(X+1) and D(X+2) are −0.2 and 0.6, respectively. This type of positional relationship between the reference pixel and the interpolation pixels is called case-2.

The pixel d(x+2) of the original image contributes to the pixels D(X+2) and D(X+3) of the post-conversion image. The relative positions, with respect to d(x+2), of these post-conversion pixels D(X+2) and D(X+3) are −0.4 and 0.4, respectively. This type of positional relationship between the reference pixel and the interpolation pixels is called case-3.

The pixel d(x+3) of the original image contributes to the pixels D(X+3) and D(X+4) of the post-conversion image. The relative positions, with respect to d(x+3), of these post-conversion pixels D(X+3) and D(X+4) are −0.6 and 0.2, respectively. This type of positional relationship between the reference pixel and the interpolation pixels is called case-4.

The pixel d(x+4) of the original image contributes to three pixels of the post-conversion image, that is, D(X+4), D(X+5), and D(X+6). The relative positions, with respect to d(x+3), of these post-conversion pixels D(X+4), D(X+5), and D(X+6), are −0.8, 0, and 0.8. This type of positional relationship between the reference pixel and the interpolation pixels is case-1.

It is understood from the above description that in the case where the enlargement magnification factor is 1.25 there are four kinds of positional relationships between a reference pixels and interpolation pixels, that is, case-1 to case-4. Therefore, there are four types of contribution of a pixel of the original image to the post-conversion image that correspond to case-1 and case-4.

A comparison will be made of the manner of conversion of pixel data of a one-pixel width between the interpolation of this embodiment and the linear interpolation with reference to FIGS. 18*a*–18*d* to 21*a*–21*d*.

As described above, the degree of contribution of a pixel of the original image is given by an interpolation coefficient, which is determined by a positional relationship between a reference pixel and an inversely-mapped interpolation pixel. Therefore, where the enlargement magnification factor is 1.25, the comparison may be made for the four cases, that is, case-1 to case-4. Here, an example is used in which the constant K in Equations (5) is equal to 1.5.

First, a description will be made for case-1 with reference to FIGS. 18*a*–18*d*, which illustrate an example of image conversion of case-1. FIGS. 18*a*–18*d* show density value differences between adjacent pixels in a case where the linear interpolation is performed on pixel data of a one-pixel width and in a case where the interpolation of this embodiment is performed on it. The pixel data of a one-pixel width is assumed to be such that d(x)=100 and the pixel data other than d(x) are zero.

Where the interpolation of this embodiment is used, the density value D(X−1) of the pixel D(X−1) of the post-conversion image is determined as D(X−1)=Hx·d(x−1)+ GX·d(x) based on the density values d(x−1) and d(x) of the reference pixels d(x−1) and d(x) of the interpolation coefficients Hx and Gx. Since d(x−1)=0, D(X−1)=GX·d(x) is obtained. The length L between D(X−1) and d(x−1) is equal to 0.2. Therefore, in the case of the interpolation using interpolation coefficients according to Equations (5, G=0.09 is obtained by substituting L=0.2 into Equations (5). Therefore, the density value D(X−1) of the pixel D(X−1) of the post-conversion image is given such that D(X−1)= 0.09·100=9.

On the other hand, in the case of the linear interpolation, since G=L=0.2, the density value D(X−1) is calculated as 0.2·100=20.

Similarly, in the case of the interpolation of this embodiment that uses interpolation coefficients according to Equations (5), D(X)=100 and D(X+1)=28 are obtained. On the other hand, in the case of the linear interpolation, D(X)=100 and D(X+1)=20 are obtained. The details of the operations are not described here.

Figure 18A:
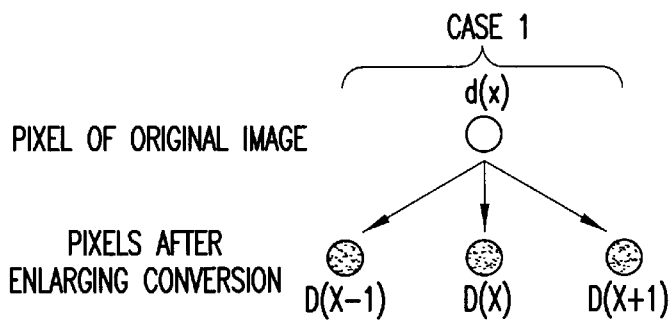
FIG. 18a shows how image conversion is performed in case—1.
Figure 18B:
FIG. 18b shows a density value of an original image in case—1.
Figure 18C:
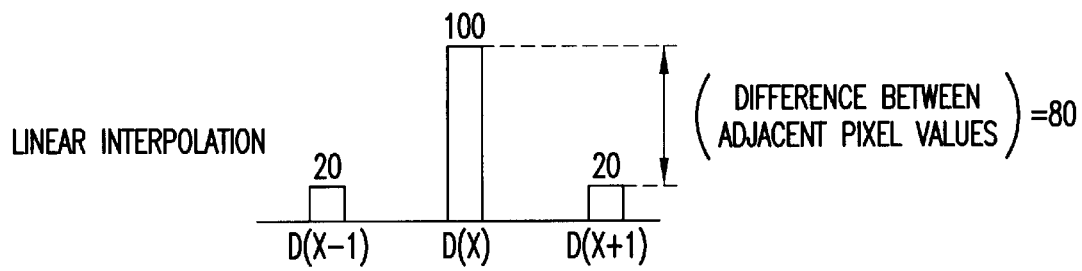
FIG. 18c shows density values of a post-conversion image obtained by the linear interpolation in case—1.
Figure 18D:
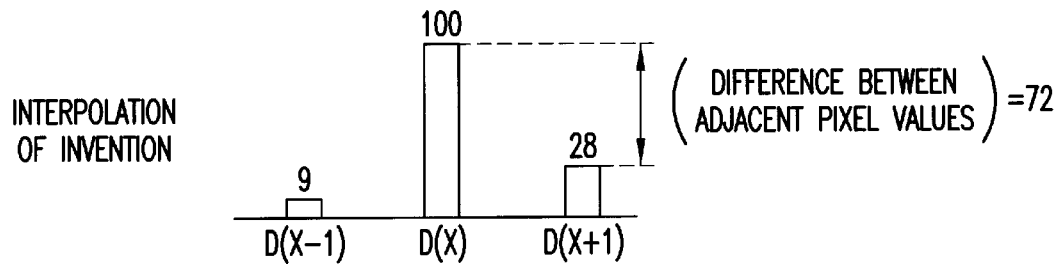
FIG. 18d shows density values of a post-conversion image obtained by the interpolation of the first embodiment in case—1.

As shown in FIGS. 18*c* and 18*d,* while in the case of the linear conversion the differences between the density values of the adjacent pixels of the post-conversion image are 80, in the case of the interpolation of this embodiment the smaller one of the differences between the density values of the adjacent pixels of the post-conversion image is 72 (between D(X) and D(X+1)).

Next, consideration will be given to case-2.

FIGS. 19*a*–19*d* illustrate an example of image conversion of case-2, and compare density value differences between adjacent pixels in a case where the linear interpolation is performed on pixel data of a one-pixel width and in a case where the interpolation of this embodiment is performed on it. The pixel data of a one-pixel width is assumed to be such that d(x+1)=100 and the pixel data other than d(x+1) are zero.

Figure 19A:
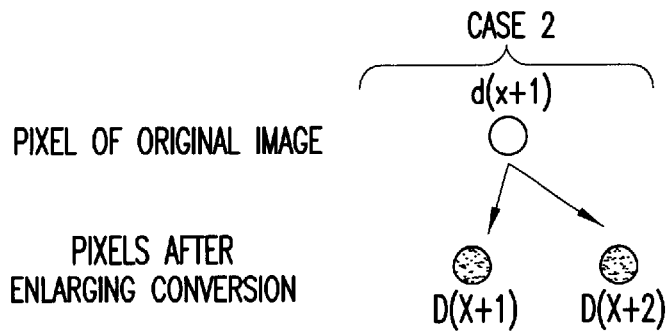
FIG. 19a shows how image conversion is performed in case—2.
Figure 19B:
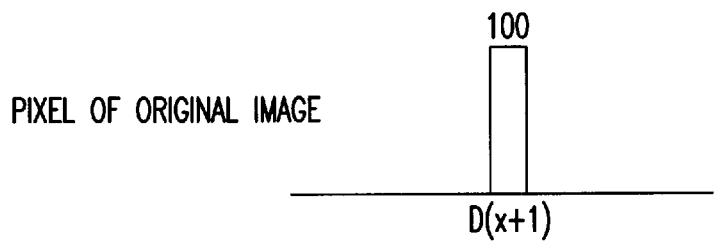
FIG. 19b shows a density value of an original image in case—2.
Figure 19C:
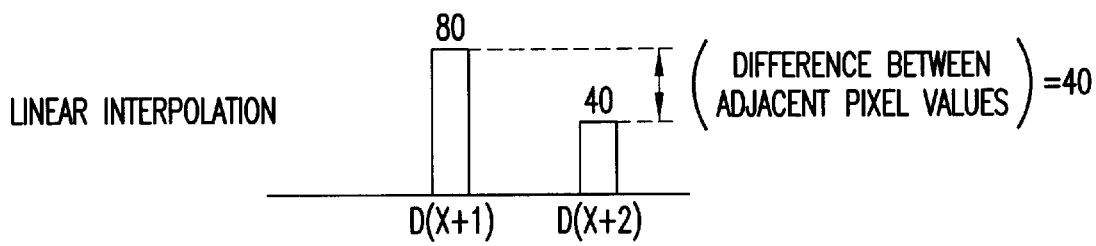
FIG. 19c shows density values of a post-conversion image obtained by the linear interpolation in case—2.
Figure 19D:
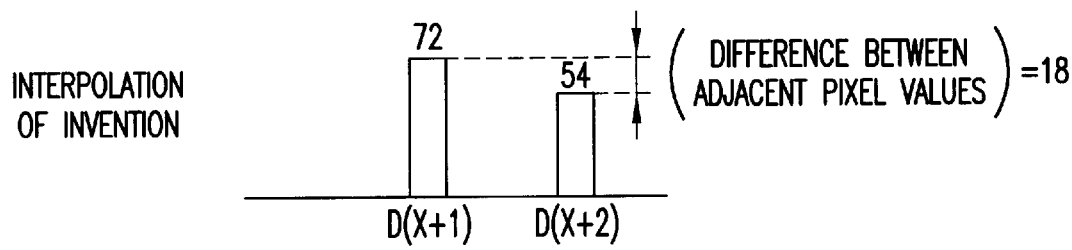
FIG. 19d shows density values of a post-conversion image obtained by the interpolation of the first embodiment in case—2.

FIGS. 19*c* and 19*d* show calculation results of the density values D(X+1) and D(X+2) by the linear interpolation and the interpolation of this embodiment, respectively. The details of the operation are not described here.

As shown in FIGS. 19c and 19d, while in the case of the linear conversion the difference between the density values of the adjacent pixels of the post-conversion image is 40, in the case of the interpolation of this embodiment using interpolation coefficients according to Equations (5) the difference between the density values of the adjacent pixels of the post-conversion image is 18.

Next, consideration will be given to case-3.

FIGS. 20a–20d illustrate an example of image conversion of case-3, and compare density value differences between adjacent pixels in a case where the linear interpolation is performed on pixel data of a one-pixel width and in a case where the interpolation of this embodiment is performed on it. The pixel data of a one-pixel width is assumed to be such that d(x+2)=100 and the pixel data other than d(x+2) are zero.

Figure 20A:
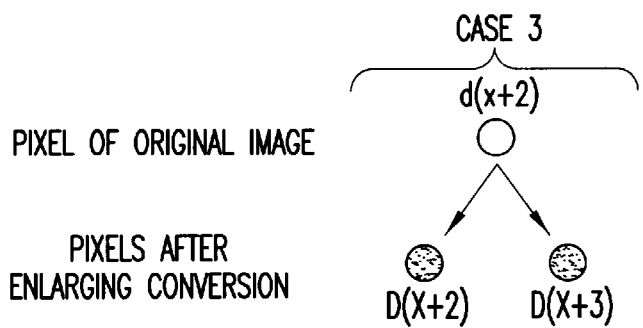
FIG. 20a shows how image conversion is performed in case—3.
Figure 20B:
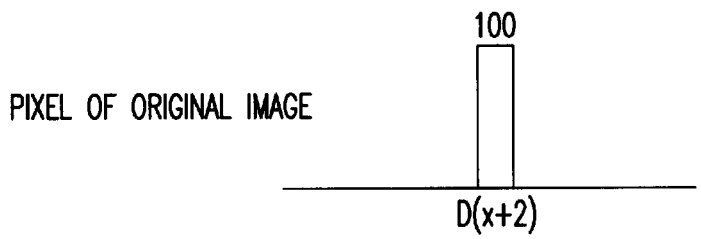
FIG. 20b shows a density value of an original image in case—3.
Figure 20C:
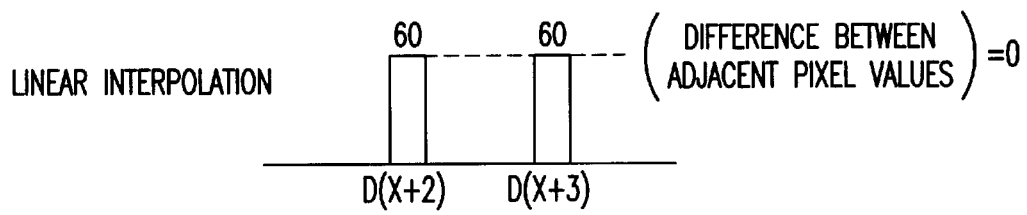
FIG. 20c shows density values of a post-conversion image obtained by the linear interpolation in case—3.
Figure 20D:
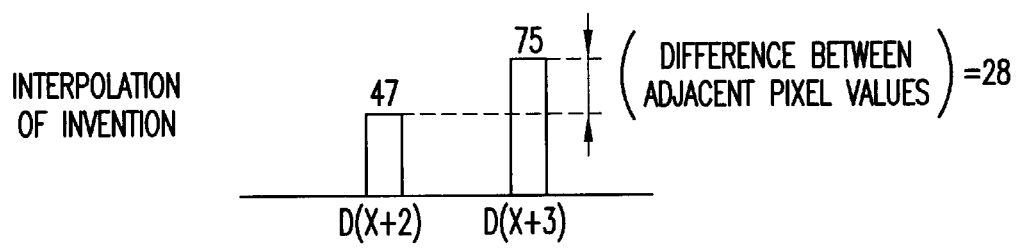
FIG. 20d shows density values of a post-conversion image obtained by the interpolation of the first embodiment in case—3.

FIGS. 20c and 20d show calculation results of the density values D(X+2) and D(X+3) by the linear interpolation and the interpolation of this embodiment, respectively. The details of the operations are not described here.

As shown in FIGS. 20c and 20d, in the case of the linear conversion, D(X+2)=D(X+3)=60 is obtained, which means that the adjacent pixels have the same density value. Therefore, the difference between the density values of the adjacent pixels is 0. On the other hand, in the case of the interpolation of this embodiment, the difference between the density values of the adjacent pixels is 28.

Finally, consideration will be given to case-4.

FIGS. 21a–21d illustrate an example of image conversion of case-4, and compare density value differences between adjacent pixels in a case where the linear interpolation is performed on pixel data of a one-pixel width and in a case where the interpolation is this embodiment is performed on it. The pixel data of a one-pixel width is assumed to be such that d(x+3)=100 and the pixel data other than d(x+3) are zero.

Figure 21A:
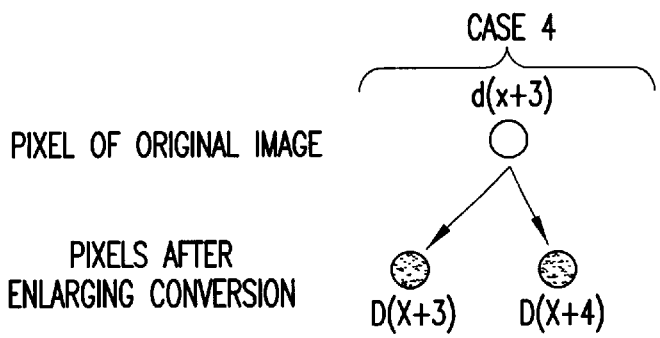
FIG. 21a shows how image conversion is performed in case—4.
Figure 21B:
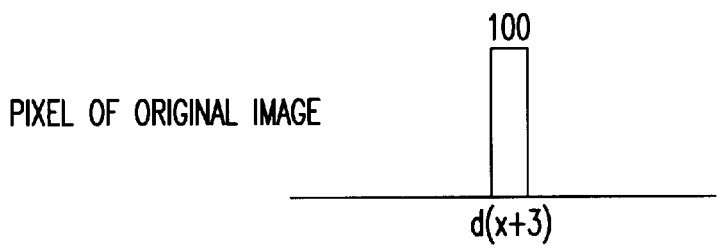
FIG. 21b shows a density value of an original image in case—4.
Figure 21C:
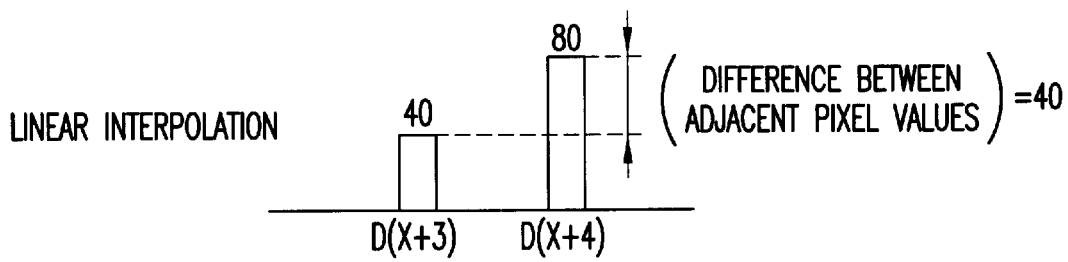
FIG. 21c shows density values of a post-conversion image obtained by the linear interpolation in case—4.
Figure 21D:
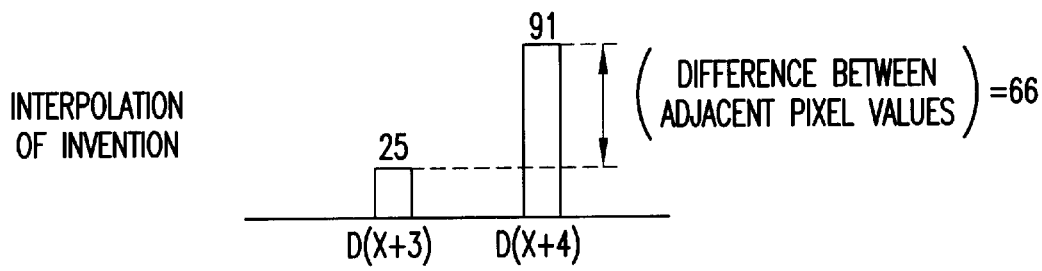
FIG. 21d shows density values of a post-conversion image obtained by the interpolation of the first embodiment in case—4.

FIGS. 21c and 21d show calculation results of the density values D(X+3) and D(X+4) by the linear interpolation and the interpolation of this embodiment, respectively. The details of the operations are not described here.

As shown in FIGS. 21c and 21d, while in the case of the linear conversion the difference between the density values of the adjacent pixels of the post-conversion image is 40, in the case of the interpolation of this embodiment using interpolation coefficients according to Equations (5) the difference between the density values of the adjacent pixels of the post-conversion image is 66.

Now, attention is paid to the minimum value among the calculation values of the differences between the density values of the adjacent pixels of the post-conversion image. In the case of the conversion by the linear interpolation, the minimum value among the differences between the density values of the adjacent pixels is 0 and occurs in case-3. In this case, pixel data of a one-pixel width in the original image appears as pixel data of a two-pixel width in the post-conversion image, which will be recognized as blurring. On the other hand, in the case of the interpolation of the present embodiment, the minimum value among the differences between the density values of the adjacent pixels is 18 and occurs in case-2. In this case, pixel data are less likely recognized as those of a two-pixel width, whereby blurring will be avoided. That is, the specific examples of FIGS. 18a–18d to 21a–21d show that the degree of blurring can be made lower in the interpolation of this embodiment than in the linear interpolation.

Figure 22:
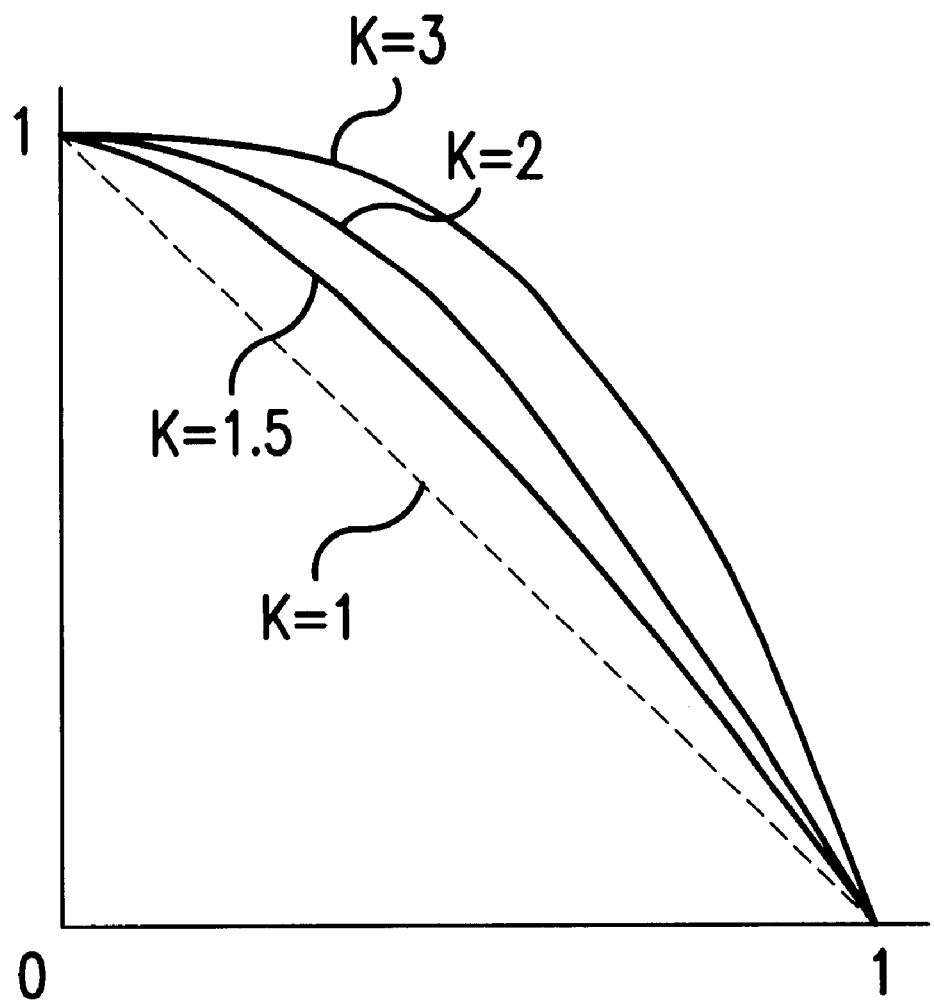
FIG. 22 is a graph showing a relationship between an interpolation coefficient H and a constant K used in the number-of pixels conversion apparatus according to the first embodiment.

FIG. 22 is a graph showing a relationship between the interpolation coefficient H and the constant K in Equations (5) in this embodiment. The rate of variation, that is, the steepness, of the interpolation coefficient H according to Equations (5) can be adjusted freely by the constant K. For example, the interpolation method of the first embodiment approaches the linear interpolation method as the constant K becomes closer to 1.

As described above, in this embodiment, the steepness of the variation of the interpolation coefficients with respect to the distance between an interpolation pixel and a reference pixel can be adjusted by changing the constant K in Equations (5) and (6). In addition, the degrees of contribution of a reference pixel to respective interpolation pixels can be differentiated from each other. Therefore, the sharpness of a post-conversion image can be adjusted easily.

Although this embodiment is directed to the case where K has the same value for the horizontal direction (x-direction) and the vertical direction (y-direction), it goes without saying that K may have different values for those directions.

Embodiment 2

Interpolation coefficients used in a number-of-pixels conversion apparatus according to a second embodiment of the invention will be described below.

While in the first embodiment the interpolation coefficients satisfy Equations (5) and (6), in this embodiment the interpolation coefficients are defined according to polygonal line functions of Equations (8) and (9) below.

First, the interpolation coefficients Hx and Gx satisfy Equations (8).

$$Hx=1-\{a_j(p-b_j)+c_j\}$$
$$Gx=1-Hx=a_j(p-b_j)+c_j \qquad (8)$$

The interpolation coefficients Hy and Gy satisfy Equations (9).

$$Hy=1-\{a_j(q-b_j)+c_j\}$$
$$Gy=1-Hy=a_j(q-b_j)+c_j \qquad (9)$$

In Equations (8) and (9), j=0, 1, . . .

$0 \leq a_j$, $0 \leq b_j \leq 1$, $0 \leq c_j \leq 1$, p is the distance in the x-direction between the interpolation pixel D(x+p, y+q) and the reference pixel d(x, y), q is the distance in the y-direction between the interpolation pixel D(x+p, y+q) and the reference pixel d(x, y), and $a_j$ is numbers at least one of which are greater than 1.

Figure 23A:
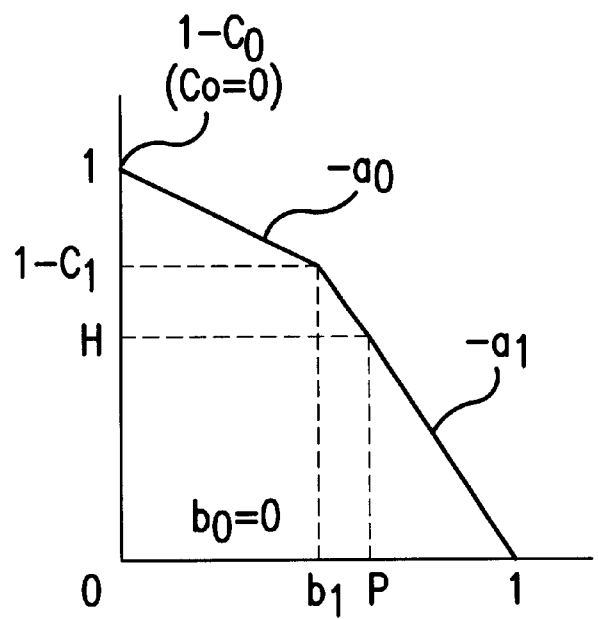
FIGS. 23a and 23b illustrate interpolation coefficients used in a number-of-pixels conversion apparatus according to a second embodiment of the invention.
Figure 23B:
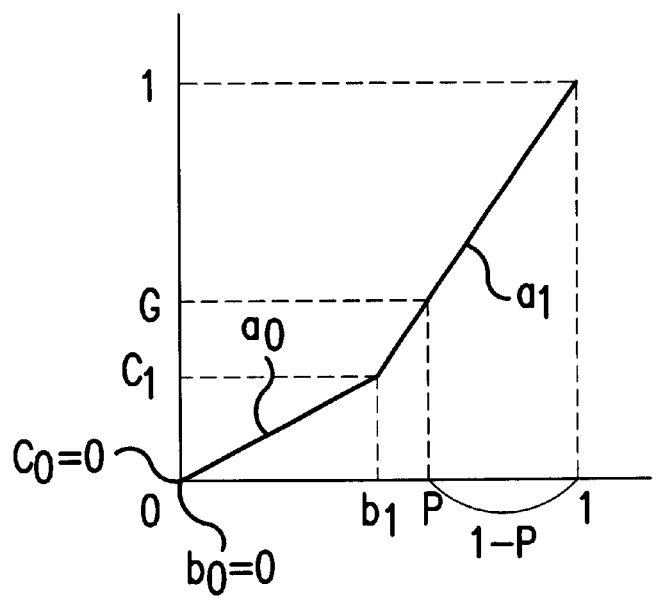

FIGS. 23a and 23b show interpolation coefficients used in this embodiment in which the maximum number of j is equal to 1. In FIGS. 23a and 23b, relationships $0<a_0<1<a_1$, $0=b_0<b_1<1$, and $0=c_0<c_1<1$ hold.

Next, a description will be made of the horizontal interpolation for determining t(y) from d(x, y) and d(x+1, y) in the manner as illustrated in FIG. 3.

In FIGS. 23a and 23b, the horizontal axis represents the horizontal distance p between the inversely-mapped interpolation pixel D and the reference pixel d(x, y) and the vertical axis represents the value of the interpolation coefficient H or G. The ordinate H in FIG. 23a is an interpolation coefficient by which to multiply the density value d(x, y) of the reference pixel d(x, y), and the ordinate G in FIG. 23b is an interpolation coefficient by which to multiply the density value d(x+1, y) of the reference pixel d(x+1, y).

As shown in FIG. 23a, the interpolation coefficient H decreases monotonously as the distance p between the interpolation pixel D and the reference pixel d(x, y)

increases. The slope $-a_1$ of H is smaller than $-1$ in a range of $b_1 \leq p \leq 1$. On the other hand, as shown in FIG. 23b, the interpolation coefficient G increases monotonously as the distance p increases. The slope $a_1$ of G is greater than 1 in a range of $b_1 \leq p \leq 1$.

The vertical interpolation is performed in a manner similar to the above horizontal interpolation, it is not described in detail here.

In this embodiment, as shown in FIGS. 23a and 23b, the interpolation coefficients H and G vary steeply with respect to the distance between the interpolation pixel and the reference pixel in the range of p (or q) that is close to 1. Therefore, a less blurred post-conversion image can be obtained.

Figure 24:
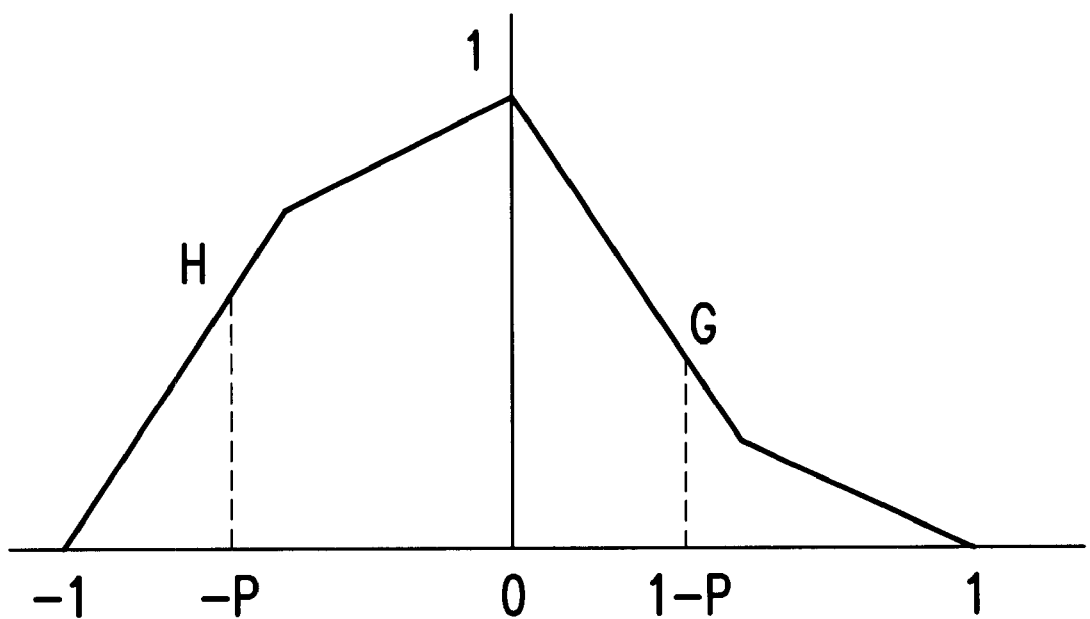
FIGS. 24 shows an interpolation characteristic of the number-of-pixels conversion apparatus according to the second embodiment.

FIG. 24 shows an interpolation characteristic that is obtained when the interpolation coefficients shown in FIGS. 23a and 23b are used (the maximum number of j is 1). In FIG. 24, the vertical axis represents the interpolation coefficient and the horizontal axis represents the relative position from the coordinate of the inversely-mapped interpolation pixel D. The negative side of the horizontal axis corresponds to the interpolation coefficient H, and hence an interpolation coefficient H at an abscissa $-p$ gives an interpolation coefficient by which to multiply $d(x, y)$. The positive side of the horizontal axis corresponds to the interpolation coefficient G, and hence an interpolation coefficient G at an abscissa $1-p$ gives an interpolation coefficient by which to multiply $d(x+1, y)$.

The interpolation characteristic shown in FIG. 24 is asymmetrical with respect to the vertical axis. As described above, in the interpolation having such an asymmetrical interpolation characteristic, the degree of contribution of reference pixel to respective interpolation pixels can be made different from each other. Therefore, for example, when pixel data of a thin line is converted, it is less likely that the corresponding line in a post-conversion image is recognized as a thick line.

Therefore, in this embodiment, as in the case of the first embodiment, the degree of blurring can be made lower than that in the conventional method.

Further, in this embodiment, by modifying the polygonal line shape by changing the constants $a_0$, $a_1$, $b_0$, $b_1$, $c_0$, and $c_1$, the steepness of the variation of the interpolation coefficients H and G with respect to the distance between an interpolation pixel and a reference pixel can be changed, whereby the sharpness of a post-conversion image can be adjusted.

Figure 25:
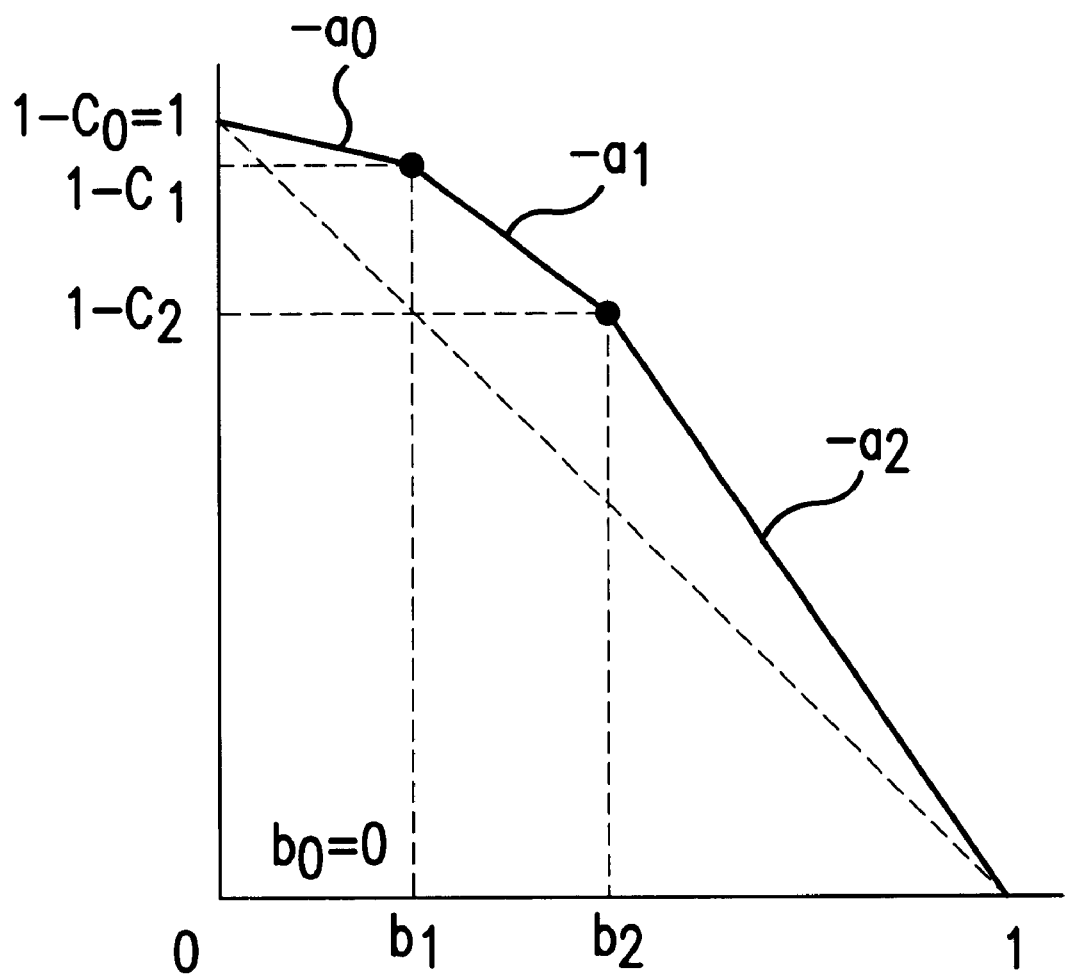
FIG. 25 illustrates another example of an interpolation coefficient used in the number-of-pixels conversion apparatus according to the second embodiment.

Although the above description is directed to the case where the maximum number of j is 1, that is, two segments are used, interpolation coefficients having a feature of a polygonal line function that includes three segments as shown in FIG. 25 (the maximum number of j is 2) may also be used. The latter case enables a finer adjustment of the sharpness of a post-conversion image than the case of generating the interpolation coefficients H and G having a feature of a polygonal function that includes two segments. It goes without saying that the maximum number of j is not limited to 1 and 2 and may be a number greater than 2.

Next, a number-of-pixels conversion apparatus using the interpolation having the above interpolation characteristic will be described with reference to FIG. 26. This number-of-pixels conversion apparatus has the same configuration as that of the first embodiment except for the interpolation coefficient generator.

Figure 26:
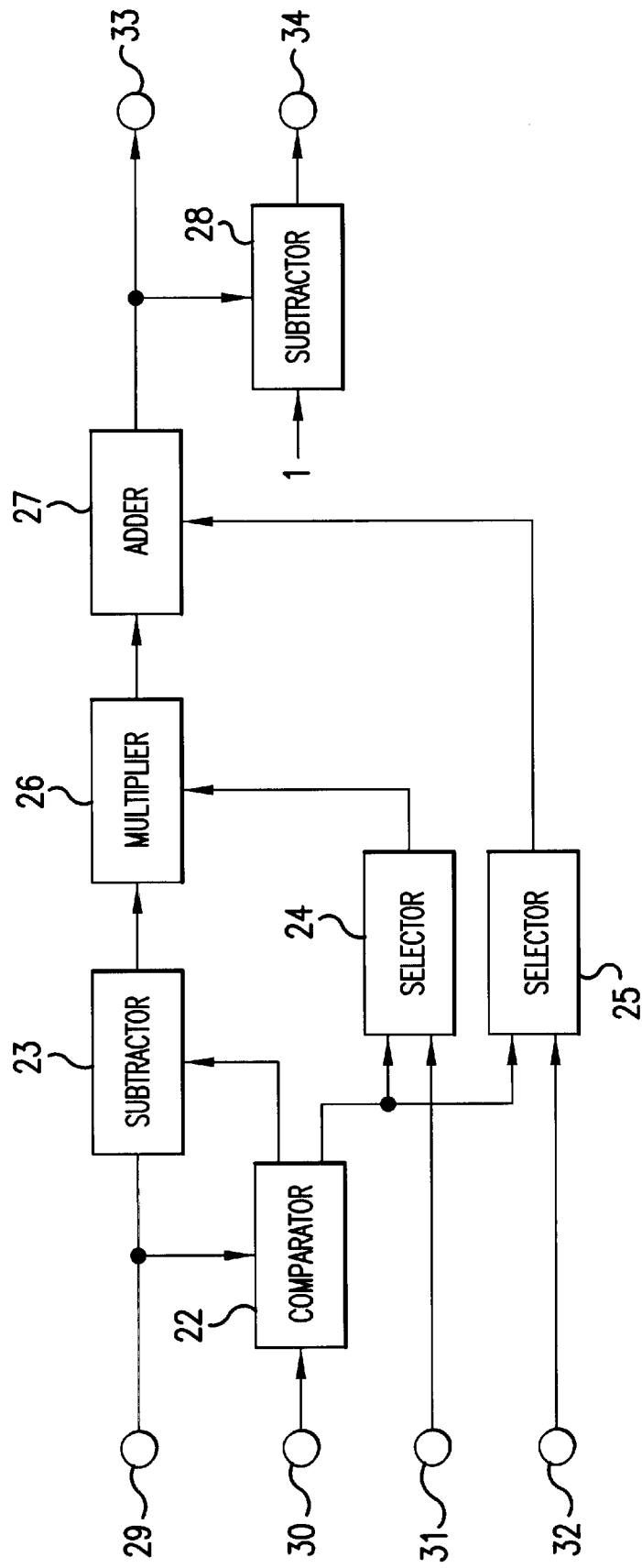
FIG. 26 is a block diagram showing the configuration of an interpolation coefficient generator in the number-of-pixels conversion apparatus according to the second embodiment.

FIG. 26 shows the configuration of each of interpolation coefficient generators 54 and 55 of this embodiment that correspond to the interpolation coefficient generator 4 and 5 of the first embodiment.

The interpolation coefficient generator 54 and 55 generate interpolation coefficients H and G according to Equations (10) below.

$$H = 1 - \{a_j(L-b_j)+c_j\}$$
$$G = 1 - H = a_j(L-b_j)+c_j \qquad (10)$$

where $j = 0, 1, \ldots$ $0 \leq a_j, 0 \leq b_j \leq 1, 0 \leq c_j \leq 1,$

L (p or q) is the distance between the interpolation pixel and the reference pixel, and $a_j$ are numbers at least one of which is greater than 1.

In FIG. 26, reference numeral 22 denotes a comparator; 23, a subtractor; 24 and 25, selectors; 26, a multiplier; 27, an adder; 28, a subtractor; and 29–34, terminals.

The operation of the interpolation coefficient generator 54 of this embodiment that generates the horizontal interpolation coefficients Hx and Gx will be described below by using, as an example, the horizontal interpolation for determining $t(y)$ from $d(x, y)$ and $d(x+1, y)$ in the manner as illustrated in FIG. 3.

The horizontal distance p between the interpolation pixel D and the reference pixel $d(x, y)$ that has been generated by the position information generator 3 is input from the terminal 29, and supplied to the comparator 22 and the subtractor 23.

Constants $a_j$, $b_j$, and $c_j$ are input from the terminals 31, 30, and 32 and supplied to the selector 24, the comparator 22, and the selector 25, respectively.

The comparator 22 compares p and the constants $b_j$ and generates $b_i$ and i (i=0, 1, ...) that satisfy $b_i \leq p < b_{i+1}$.

The constant $b_i$ is supplied to the subtractor 23, which generates a subtraction result $p-b_i$ based on p and the comparison result $b_i$. The subtraction result $p-b_i$ is supplied to the multiplier 26.

The subtraction result i is supplied to the selectors 24 and 25. The selector 24 selects $a_i$ from the constants $a_j$ and outputs it. The selector 25 selects $c_i$ from the constants $c_j$ and outputs it. The constants $a_i$ and $c_i$ are supplied to the multiplier 26 and the adder 27, respectively.

The multiplier 26 generates a multiplication result $a_i(p-b_i)$ based on the subtraction result $p-b_i$ and the selection result $a_i$ and supplies it to the adder 27.

The adder 27 generates an addition result $a_i(p-b_i)+c_i$ based on the multiplication result $a_i(p-b_i)$ and the selection result $c_i$. The addition result $a_i(p-b_i)+c_i$ as a horizontal interpolation coefficient Gx is output from the terminal 33 and supplied to the subtractor 28.

The subtractor 28 generates a subtraction result $1-\{a_i(p-b_i)+c_i\}$, which is output from the terminal 34 as an interpolation coefficient Hx.

The operation of the vertical interpolation coefficient generator 55 can be understood through consideration using, as an example, the vertical interpolation for determining the density of the interpolation pixel D from $t(y)$ and $t(y+1)$ in the manner as illustrated in FIG. 4.

Although the above embodiment is directed to the case where each of $a_j$, $b_j$, and $c_j$ has the same value for the horizontal direction (x-direction) and the vertical direction (y-direction), it is apparent that each of $a_j$, $b_j$, and $c_j$ may have different values for the horizontal and vertical directions.

The invention has been described with respect to certain preferred embodiments. Various modifications and additions within the spirit of the invention will occur to those of ordinary skill in the art. Accordingly, the scope of the invention is limited solely by the following claims.

What is claimed is:

1. A number-of-pixels conversion apparatus for converting the number of pixels of an original image through an interpolation operation at an arbitrary conversion magnification factor, comprising:

a memory for temporarily storing digital pixel data of the original image;

position information generating means for extracting a reference pixel to be used for generating an interpolation pixel through interpolation from pixels of the original image, and for generating address information of the reference pixel and information of a distance between the interpolation pixel and the reference pixel;

memory control means for reading out pixel data corresponding to the reference pixel from the memory based on the address information generated by the position information generating means;

interpolation coefficient generating means for generating an interpolation coefficient that is obtained by a function with the distance between the interpolation pixel and the reference pixel in accordance with the distance information generated by the position information generating means, said function having a first derivative that is smaller than −1 at least in a partial range; and interpolation operation means for performing an interpolation operation based on the pixel data corresponding to the reference pixel read out by the memory control means and the interpolation coefficient generated by the interpolation coefficient generating means.

2. The apparatus of claim 1, wherein the function having a monotonously decreasing functional portion has an asymmetrical characteristic in a graph with respect to a position of the interpolation pixel.

3. The apparatus of claim 2, wherein the function having a monotonously decreasing functional portion varies with respect to the distance between the interpolation pixel and the reference pixel so as to assume a curved shape in a graph.

4. The apparatus of claim 2, wherein the interpolation coefficient generating means generates interpolation coefficients H and G according to exponential operation formulae of $$H=1-L^K$$

$$G=1-H=L^K$$

where K is a constant and L is the distance between the interpolation pixel and the reference pixel.

5. The apparatus of claim 2, wherein the function having a monotonously decreasing functional portion varies with respect to the distance between the interpolation pixel and the reference pixel so as to assume a polygonal line in a graph.

6. The apparatus of claim 2, wherein the interpolation coefficient generating means generates interpolation coefficients H and G according to first-order operation formulae of $$H=1-\{a_j(L-b_j)+c_j\}$$

$$G=1-H=a_j(L-b_j)+c_j$$

where $j=0, 1, \ldots, a_j, b_j,$ and $c_j$ are constants and satisfy $0 \leq a_j$, $0 \leq b_j \leq 1$, and $0 \leq c_j \leq 1$, L is the distance between the interpolation pixel and the reference pixel, and at least one of $a_j$ is greater than 1.

7. The apparatus of claim 2, wherein the position information generating means cumulatively adds reciprocals of an enlargement magnification factor, and generates the address information of the reference pixel based on an integer portion of a cumulative addition result and generates the distance information between the interpolation pixel and the reference pixel based on a decimal portion of the cumulative addition result.

8. The apparatus of claim 2, wherein the interpolation coefficient generating means includes:

Kth-power operation means receiving the distance information between the interpolation pixel and the reference pixel generated by the position information generating means, for calculating a Kth power of the distance and outputting an operation result, where K is a constant; and subtracting means receiving the operation result of the Kth-power operation means, for subtracting the received operation result from 1 and outputting a subtraction result.

9. The apparatus of claim 2, wherein the interpolation coefficient generating means includes:

comparing means receiving the information of the distance L between the interpolation pixel and the reference pixel generated by the position information generating means and constants $b_j$ that are not smaller than 0 and not greater than 1, where $j=0, 1, \ldots,$ for comparing the distance L with the constants $b_j$ and outputting $b_i$ and i that satisfy $b_i \leq L < b_{i+1}$, where $i=0, 1, \ldots$ ;

first subtracting means receiving the information of the distance L generated by the position information generating means and $b_i$ that is output from the comparing means, for calculating $L-b_i$ and outputting a subtraction result;

first selecting means receiving i that is output from the comparing means and constants $a_j$ that are not smaller than 0 and at least one of which is greater than 1, where $j=0, 1, \ldots,$ for selecting $a_i$ from $a_j$;

second selecting means receiving i that is output from the comparing means and constants $c_j$ that are not smaller than 0 and not greater than 1, where $j=0, 1, \ldots,$ for selecting $c_i$ from $c_j$;

multiplying means receiving $a_i$ selected by the first selecting means and the subtraction result $L-b_i$ that is output from the first subtracting means, for calculating $a_i(L-b_i)$ and outputting a multiplication result;

adding means receiving $c_i$ selected by the second selecting means and the multiplication result $a_i(L-b_i)$ that is output from the multiplying means, for calculating $a_i(L-b_i)+c_i$ and outputting an addition result; and second subtracting means receiving the addition result $a_i(L-b_i)+c_i$ that is output from the adding means, for calculating $1-\{a_i(L-b_i)+c_i\}$ and outputting a subtraction result.

10. A display apparatus which converts the number of pixels of an original image through an interpolation operation at an arbitrary conversion magnification factor and displays a post-conversion image, comprising:

a memory for temporarily storing digital pixel data of the original image;

position information generating means for extracting a reference pixel to be used for generating an interpolation pixel through interpolation from pixels of the original image, and for generating address information of the reference pixel and information of a distance between the interpolation pixel and the reference pixel;

memory control means for reading out pixel data corresponding to the reference pixel from the memory based on the address information generated by the position information generating means;

interpolation coefficient generating means for generating an interpolation coefficient that is obtained by a function with the distance between the interpolation pixel and the reference pixel in accordance with the distance information generated by the position information generating means, said function having a first derivative that is smaller than −1 at least in a partial range;

interpolation operation means for performing an interpolation operation based on the pixel data corresponding to the reference pixel read out by the memory control means and the interpolation coefficient generated by the interpolation coefficient generating means; and a display device for displaying an image based on an output of the interpolation operation means.

11. The apparatus of claim 10, wherein the function having a monotonously decreasing functional portion has an asymmetrical characteristic in a graph with respect to a position of the interpolation pixel.

12. The apparatus of claim 11, wherein the function having a monotonously decreasing functional portion varies with respect to the distance between the interpolation pixel and the reference pixel so as to assume a curved shape in a graph.

13. The apparatus of claim 11, wherein the interpolation coefficient generating means generates interpolation coefficients H and G according to exponential operation formulae of $$H=1-L^K$$

$$G=1-H=L^K$$

where K is a constant and L is the distance between the interpolation pixel and the reference pixel.

14. The apparatus of claim 11, wherein the function having a monotonously decreasing function portion varies with respect to the distance between the interpolation pixel and the reference pixel so as to assume a polygonal line in a graph.

15. The apparatus of claim 11, wherein the interpolation coefficient generating means generates interpolation coefficients H and G according to first-order operation formulae of $$H=1-\{a_j(L-b_j)+c_j\}$$

$$G=1-H=a_j(L-b_j)+c_j$$

where j=0, 1, . . . , $a_j$, $b_j$, and $c_j$ are constants that are given in advance and satisfy $0 \leq a_j$, $0 \leq b_j \leq 1$, and $0 \leq c_j \leq 1$, L is the distance between the interpolation pixel and the reference pixel, and at least one of $a_j$ is greater than 1.

16. The apparatus of claim 11, wherein the position information generating means cumulatively adds reciprocals of an enlargement magnification factor, and generates the address information of the reference pixel based on an integer portion of a cumulative addition result and generates the distance information between the interpolation pixel and the reference pixel based on a decimal portion of the cumulative addition result.

17. The apparatus of claim 11, wherein the interpolation coefficient generating means includes:

Kth-power operation means receiving the distance information between the interpolation pixel and the reference pixel generated by the position information generating means, for calculating a Kth power of the distance and outputting an operation result, where K is a constant; and subtracting means receiving the operation result of the Kth-power operation means, for subtracting the received operation result from 1 and outputting a subtraction result.

18. The apparatus of claim 11, wherein the interpolation coefficient generating means includes:

comparing means receiving the information of the distance L between the interpolation pixel and the reference pixel generated by the position information generating means and constants $b_j$ that are not smaller than 0 and not greater than 1, where j=0, 1, . . . , for comparing the distance L with the constants $b_j$ and outputting $b_i$ and i that satisfy $b_i \leq L < b_{i+1}$, where i=0, 1, . . . ;

first subtracting means receiving the information of the distance L generated by the position information generating means and $b_i$ that is output from the comparing means, for calculating L−$b_i$ and outputting a subtraction result;

first selecting means receiving i that is output from the comparing means and constants $a_j$ that are not smaller than 0 and at least one of which is greater than 1, where j=0, 1, . . . , for selecting $a_i$ from $a_j$;

second selecting means receiving i that is output from the comparing means and constants $c_j$ that are not smaller than 0 and not greater than 1, where j=0, 1, . . . , for selecting $c_i$ from $c_j$;

multiplying means receiving $a_i$ selected by the first selecting means and the subtraction result L−$b_i$ that is output from the first subtracting means, for calculating $a_i$(L−$b_i$) and outputting a multiplication result;

adding means receiving $c_i$ selected by the second selecting means and the multiplication result $a_i$(L−$b_i$) that is output from the multiplying means, for calculating $a_i$(L−$b_i$)+$c_i$ and outputting an addition result; and second subtracting means receiving the addition result $a_i$(L−$b_i$)+$c_i$ that is output from the adding means, for calculating 1−{$a_i$(L−$b_i$)+$c_i$} and outputting a subtraction result.

19. A number-of-pixels conversion apparatus, comprising:

an interpolation coefficient generator, operable to generate an interpolation coefficient based on a distance between a reference pixel and an interpolation pixel; and an interpolator, operable to perform interpolation, based on the interpolation coefficient and pixel data of the reference pixel;

wherein the interpolation coefficient is a function of the distance between the reference pixel and the interpolation pixel, the function having a first derivative that is smaller than −1 at least in a partial range.

20. The number-of-pixel conversion apparatus of claim 19, wherein an interpolation characteristic determined from the interpolation coefficients is asymmetric.

21. The number-of-pixel conversion apparatus of claim 19, wherein the function is non-linear.

22. The number-of-pixel conversion apparatus of claim 19, wherein the interpolation coefficient generating means generates interpolation coefficients H and G according to:

$$H=1-L^K$$

$$G=1-H=L^K$$

where K is a constant and L is the distance between the interpolation pixel and the reference pixel.

23. The number-of-pixel conversion apparatus of claim 19, wherein the function includes at least two polygonal line function.

24. The number-of-pixel conversion apparatus of claim 19, wherein the interpolation coefficient generating means generates interpolation coefficients H and G according to:

$$H=1-\{a_j(L-b_j)+c_j\}$$

$$G=1-H=a_j(L-b_j)+c_j$$

where $j=0, 1, \ldots, a_j, b_j$, and $c_j$ are constants and satisfy $0 \leq a_j$, $0 \leq b_j \leq 1$, and $0 \leq c_j \leq 1$, L is the distance between the interpolation pixel and the reference pixel, and at least one of $a_j$ is greater than 1.

25. A display apparatus, comprising:
   an interpolation coefficient generator, operable to generate an interpolation coefficient based on a distance between a reference pixel and an interpolation pixel;
   an interpolator, operable to perform interpolation, based on the interpolation coefficient and pixel data of the reference pixel; and
   a display, operable to display an image based on pixel data created using the interpolation coefficient;
wherein the interpolation coefficient is a function of the distance between the reference pixel and the interpolation pixel, the function having a first derivative that is smaller than −1 at least in a partial range.

26. The display apparatus of claim 25, wherein an interpolation characteristic determined from the interpolation coefficients is asymmetric.

27. The display apparatus of claim 25, wherein the function is non-linear.

28. The display apparatus of claim 25, wherein the interpolation coefficient generating means generates interpolation coefficients H and G according to:

$$H=1-L^K$$

$$G=1-H=L^K$$

where K is a constant and L is the distance between the interpolation pixel and the reference pixel.

29. The display apparatus of claim 25, wherein the function includes at least two polygonal line function.

30. The display apparatus of claim 25, wherein the interpolation coefficient generating means generates interpolation coefficients H and G according to:

$$H=1-\{a_j(L-b_j)+c_j\}$$

$$G=1-H=a_j(L-b_j)+c_j$$

where $j=0, 1, \ldots, a_j, b_j$, and $c_j$ are constants and satisfy $0 \leq a_j$, $0 \leq b_j \leq 1$, and $0 \leq c_j \leq 1$, L is the distance between the interpolation pixel and the reference pixel, and at least one of $a_j$ is greater than 1.

* * * * *